US006136417A

United States Patent [19]

Ishibuchi et al.

[11] Patent Number: 6,136,417

[45] Date of Patent: Oct. 24, 2000

[54] CORRUGATOR AND CORRUGATED FIBERBOARD SHEET MANUFACTURING METHOD

[75] Inventors: Hiroshi Ishibuchi; Hiroyuki Takenaka; Yukuharu Seki; Makoto Ando, all of Hiroshima-ken, Japan

[73] Assignee: Mitsubishi Heavy Industries, Ltd., Japan

[21] Appl. No.: 09/181,659

[22] Filed: Oct. 29, 1998

[30] Foreign Application Priority Data

Jun. 2, 1998 [JP] Japan .................................. 10-025635

[51] Int. Cl.[7] .............................. B32B 3/28; G01N 7/00; B31F 1/22

[52] U.S. Cl. ............................ 428/182; 73/29.01; 73/73; 156/205; 156/462; 264/286; 493/463

[58] Field of Search .................................... 428/182, 184; 156/209, 205, 210, 462, 208, 314; 493/463, 3, 37; 38/3; 73/29.01, 73; 162/111; 264/40.1, 40.4, 286; 425/396

[56] References Cited

U.S. PATENT DOCUMENTS 3,033,708 5/1962 McKee .................................... 428/182
3,085,026 4/1963 Weisgerber et al. .................... 428/182

FOREIGN PATENT DOCUMENTS 8-034081 2/1996 Japan .

*Primary Examiner*—Donald Loney
*Attorney, Agent, or Firm*—Rothwell, Figg, Ernst & Manbeck, p.c.

[57] ABSTRACT

The present invention relates to a corrugator and corrugated fiberboard sheet manufacturing method which are capable of accurately adjusting the quantity of moisture included in a sheet to certainly suppress the warp deformation of the sheet with the passage of time. The corrugator has an adhering section equipped with a plurality of pressurizing units separately disposed in series along a sheet conveying direction, where a front linerboard and a rear linerboard are adhered to each other to form a corrugated fiberboard sheet and the corrugated fiberboard sheet formed in the adhering section is processed into a predetermined configuration in a processing section standing on the downstream side of the adhering section. The corrugator comprises sensors placed on the upstream side of the processing section for detecting moisture content conditions of the front linearboard and the rear linerboard, respectively, moisturizing units provided on the upstream side of the sensors and on the downstream side of the adhering section for directly supplying moisture to surfaces of the front linerboard and the rear linerboard and a controller for setting moisture quantities to be supplied from said moisturizing units on the basis of detection information from said sensors.

24 Claims, 17 Drawing Sheets

2:REAR LINERBOARD
i:GROUP OF PRESSURIZING DEVICES
i'
p
i'
13'
13:PRESSING PLATE
4:SINGLE FACED CORRUGATED FIBERBOAD
1:FRONT LINERBOARD
h:GROUP OF HEATING PLATES
A4
ENLARGED SIDE-ELEVATIONAL VIEW SHOWING HEATING PART

13':SPRING
13:PRESSING PLATE
5:DOUBLE FACED CORRUGATED FIBERBOARD SHEET
i'
ENLARGED VIEW SHOWING PRESSURIZING UNIT

CORRUGATOR AND CORRUGATED FIBERBOARD SHEET MANUFACTURING METHOD

BACKGROUND OF THE INVENTION

1) Field of the Invention

The present invention relates to a corrugator and corrugated fiberboard sheet manufacturing method for bonding a front (front-side) linerboard, a corrugating medium and a rear (rear-side) linerboard together to manufacture a corrugated fiberboard sheet.

2) Description of the Related Art

FIG. 11 is a side elevational view schematically showing a prior common corrugator.

As shown in FIG. 11, a prior common corrugator is mainly composed of single facers A1, A2, a double facer B, a dry end C comprising a slitter scorer, a cut off (or cutter), a stacker and others, and a stacking or storage section D.

First, the single facers A1, A2 receive base corrugating mediums a1, a2 to shape them into a corrugated configuration and subsequently adhere them to rear-side base linerboards b1, b2 introduced thereinto in a different way, thereby producing a single faced corrugated fiberboard sheet. At this time, for setting or solidifying a starch paste used, the base corrugating mediums a1, a2 are respectively heated by preheaters d1, d2 while the rear-side base linerboards b1, b2 are respectively heated by preheaters c1, c2.

The single faced corrugated fiberboard sheet thus produced, together with a front-side base linerboard f, is heated by a preheater e, and then, is introduced through a gluing unit g into the double facer B.

This double facer B is, as shown in FIG. 12 being a side elevational view schematically showing a more detailed structure, made up of a group of heating plates h located at its lower section, a pressurizing unit i disposed above the group of heating plates h to be in opposed relation thereto for pressing a rear surface of a belt through the use of an air pressurizing device, a weight roll or the like to pressurize a single faced corrugated fiberboard sheet 4 and a front linerboard 1, and upper and lower conveyers j, k for holding and conveying a double faced corrugated fiberboard sheet 5 being an adhered assembly sheet made by the adhesion of the single faced corrugated fiberboard sheet 4, formed in a manner that a rear linerboard 2 is joined onto a corrugated medium 3 shaped into a corrugated configuration, to the front linerboard 1.

In addition, in the double facer B, the single faced corrugated fiberboard sheet 4 and the front linerboard 1 introduced between the group of heating plates h and the pressurizing unit i are situated to be adhered through a glue, attached onto the flute tip portions of the corrugated medium 3 of the single faced corrugated fiberboard 4, to each other, and the front linerboard 1 receives the heat from the group of heating plates h while sliding and traveling in a contacting condition with the group of heating plates h, so that its temperature raised thereby serves as heat to solidify the starch paste, thus manufacturing the double faced corrugated fiberboard sheet 5. The double faced corrugated fiberboard sheet 5 produced by the adhesion in this way is conveyed through the upper and low conveyers j and k to be outputted into an after-processing section including a slitter scorer 1 and a cut off m as shown in FIG. 11.

Subsequently, as shown in FIG. 11, in the dry end C, the double faced corrugated fiberboard sheet 5 outputted thereinto is slitted and ruled by the slitter scorer 1 and, further, is cut by the cut off m to be processed into divided corrugated fiberboard sheets each having a given or predetermined configuration. Further, as shown in the more-detailed side-elevational view of FIG. 13, after being conveyed by a stacker n, the double faced corrugated fiberboard sheets 5' thus divided are stacked in the stacking section D and then carried out to the external.

Meanwhile, in the case of such a prior corrugator, since the starch paste used as an adhesive is solidified to produce an adhesive force, the preheaters c1, c2, d1, d2 and e are located to heat the rear linerboard 2, the corrugated medium 3 and the single faced corrugated fiberboard sheet 4 being the adhered assembly sheet comprising the rear linerboard 2 and the corrugated medium 3, respectively. In addition, the group of heating plates h are placed to adhere the front linerboard 1 to the single faced corrugated fiberboard sheet 4 by heating from both the front linerboard 1 side and rear linerboard 2 side.

Thus, in the case of this prior corrugator, since the respective sheets are heated in its first half section, the temperature of the sheets heated is kept even in its second half section, with the result that the divided double faced corrugated fiberboard sheets 5' are stacked in the stacking section D in a dried condition assuming a considerable high temperature and low moisture.

For instance, in the divided double faced corrugated fiberboard sheets 5' immediately before stacked in the stacking section D, the moisture content on the front linerboard 1 side reaches approximately 3 to 4% while the moisture content on the rear linerboard 2 side comes to 4 to 5%, thus making a difference in moisture between the front linerboard 1 side and the rear linerboard 2 side.

Furthermore, it takes approximately several tens hours until the divided double faced corrugated fiberboard sheets 5' stacked in the stacking section D reaches the equilibrium moisture (for example, 7 to 9%), in the meantime, the front linerboard 1 and rear linerboard 2 of each of the divided double faced corrugated fiberboard sheets 5' produce moisture distributions in their planes, respectively.

FIG. 14 is an illustration of the measurement results of moisture variation in a surface circumferential section and surface central section of the front linerboard 1 or rear linerboard 2 which occurs from when they are stacked in the stacking section D until reaching the equilibrium moisture in terms of the divided double faced corrugated fiberboard sheets 5' manufactured by a prior corrugator.

In FIG. 14, as indicated by a broken line, the surface circumferential section of the front liner 1 or the rear linerboard 2 tends to absorb the moisture from the atmosphere and, hence, reaches the equilibrium moisture in approximately several hours, whereas, as indicated by a solid line in the same illustration, the surface central section of the front linerboard 1 or the rear linerboard 2 does not tend to absorb the moisture from the atmosphere and, from this reason, reaches the equilibrium moisture in approximately several tens hours because the moisture content slowly increases.

Thus, since the times taken until reaching the equilibrium moisture differ from each other to make the difference in moisture, the extension quantity of the surface circumferential section of the front linerboard 1 or the rear linerboard 2 exceeds the extension quantity of the surface central section thereof. For this reason, difficulty is experienced to maintain the plane condition of the front liner 1 or the rear liner 2, so that buckling deformation occurs, which causes warp deformation with the passage of time as shown in FIG.

15 showing a stacked condition to make it difficult to improve the quality of the double faced corrugated fiberboard sheets 5'.

Taking into consideration the passage-of-time warp deformation occurs because of the difference in moisture between the front linerboard 1 and rear linerboard 2 of the stacked double faced corrugated fiberboard sheets 5' and the passage-of-time difference in moisture between the surface central section and surface circumferential section of the stacked front linearboard 1 or rear linerboard 2 as mentioned above, there has been proposed a sheet wetting apparatus (see Japanese Patent Laid-Open (kokai) No. HEI 8-34081) which can reduce such differences in moisture.

Referring to FIG. 16, a description will be made hereinbelow of this sheet wetting apparatus.

This sheet wetting apparatus is, as shown in FIG. 16, composed of moisture sensors 14*s*, 14*r* placed on the downstream side of the upper and lower conveyers j, k, spray units (which are, in this case, for supplying water, and therefore, referred hereinafter to as water spray units) 6*s*, 6*r* provided on the further downstream side of the moisture sensors 14*s*, 14*r* for the supply of a liquid (for example, water), liquid (water) quantity adjusting units 16*s*, 16*r* respectively coupled to the spray units 6*s*, 6*r* for adjusting the flow rates of the supply liquid (in this case, water) thereto, a controller 17, a presetting unit 18, and an integrated control system (production management system) 19.

The moisture sensors 14*s*, 14*r* measure the moisture contents of the front linerboard 1 side and rear linerboard 2 side of the double faced corrugated fiberboard sheet 5 on the downstream side of the upper and lower conveyers j, k, while the controller 17 calculates an undermoisture quantity (the shortage of moisture quantity) with respect to a desired or target moisture (desired moisture value) on the basis of the outputs of the moisture sensors 14*s*, 14*r*, and further, calculates a lacking supply liquid flow rate corresponding to the calculated undermoisture quantity to adjust the flow rate of the supply liquid by the water quantity adjusting units 16*s*, 16*r* on the basis of the calculated lacking supply liquid flow rate, thereby accomplishing the sheet wetting with the adjusted supply liquid quantity through the use of the water spray units 6*s*, 6*r*.

Furthermore, the above-mentioned publication says that this sheet wetting apparatus is designed such that, if the physical properties depending on the paper quality can be grasped in advance with no use of the moisture sensors 14*s*, 14*r* and the operating condition of each portion of the corrugator is monitored so that the movement or status of the front linerboard or the rear linerboard on the line is estimable, the production management system 19, which integrally manages these known data and the monitored information, gives set values to the presetting unit 18 for the integral control of the water quantity adjusting units 16*s*, 16*r*.

However, the method of using this sheet wetting apparatus and of conducting the sheet wetting operation at the positions of the water spray units 6*s*, 6*r* can not accurately achieve the moisture supply adjustment to the sheet. That is, if the moisture supply quantities by the water spray units 6*s*, 6*r* vary to make it difficult to adjust the sheet moisture to the desired moisture, difficulty is encountered to directly detect the sheet moisture after the moisture supply, thus resulting in inaccurate moisture supply quantity to the sheet.

Still further, although, as mentioned above, the above-mentioned publication says that this sheet wetting apparatus is made such that, if the physical properties depending on the paper quality can be grasped in advance with no use of the moisture sensors 14*s*, 14*r* and the operating condition of each portion of the corrugator is monitored so that the movement or status of the front linerboard or the rear linerboard on the line is estimable, the production management system 19, which integrally manages these known data and the monitored information, gives the set values to the presetting unit 18 for the integral control of the water quantity adjusting units 16*s*, 16*r*, there is no detailed description about the paper physical properties and operating conditions to be actually taken therefor.

Moreover, a description will be taken hereinbelow of a sheet wetting apparatus with another construction. This sheet wetting apparatus is, as shown in FIG. 17, made up of moisture sensors 14*s*, 14*r* provided on the downstream side of the upper and lower conveyers j, k, water spray units 6*s*, 6*r* located on the upstream side of a pressurizing unit i and the group of heating plates h for giving a supply liquid (for example, water), liquid (water) quantity adjusting units 16*s*, 16*r* communicated with these water spray units 6*s*, 6*r*, a controller 17, and an integrated control system (production management system) 19.

The moisture sensors 14*s*, 14*r* measure the moisture contents of the front linerboard 1 side and rear linerboard 2 side of a double faced corrugated fiberboard sheet 5 on the downstream side of the upper and lower conveyers j, k, while the controller 17 calculates an undermoisture quantity with respect to a desired moisture on the basis of the outputs of the moisture sensors 14*s*, 14*r*, and further, calculates a lacking supply liquid flow rate corresponding to the calculated undermoisture quantity in order to control the flow rate of the supply liquid by the water quantity adjusting units 16*s*, 16*r* on the basis of the calculated lacking supply liquid flow rate, thereby accomplishing the sheet wetting with the adjusted supply liquid quantity through the use of the water spray units 6*s*, 6*r*.

In this case, the integrated control system 19 can emit the paper physical property data to the controller 17 so that the flow rate is adjustable while taking this data into consideration.

However, if the humidification for the sheet takes place at the positions of the water spray units 6*s*, 6*r* as mentioned in this sheet wetting apparatus, the moisture supply takes place before the adhesion between a single faced corrugated fiberboard sheet 4 and a front linerboard 1, and therefore, the adhesion therebetween is done in a state where the extension quantities thereof vary, which rather causes the upward and downward warps.

In addition, although the integrated control system 19 sends the paper physical property data to the controller 17 so that the flow rate is adjustable while taking this data into consideration, there is no concrete description about the paper physical property data to be taken into consideration.

Moreover, a description will be made hereinbelow of a sheet wetting apparatus with a different construction. This sheet wetting apparatus is, as shown in FIG. 18, designed to humidify a belt of an upper conveyer j' by a water spray unit 6*s* and further to humidify a belt of a lower conveyer k by a water spray unit 6*r* to supply moisture to a front linerboard 1 side and rear linerboard 2 side of a double faced corrugated fiberboard sheet 5 through the belts thus humidified.

However, the moisturizing method based upon such a sheet wetting apparatus can not sufficiently humidify the sheet and can not perform the fine control of the moisture supply quantity.

Meanwhile, although the prior corrugators are designed such that, in the double facer B, the pressurizing unit presses a rear surface of a belt through an air pressurizing device, a weight roll or the like to pressurize the single faced corrugated fiberboard sheet 4 and the front linerboard 1, it has been proposed that, in order to improve the quality of the double faced corrugated fiberboard sheet 5, a plurality of pressurizing units are separately disposed along the sheet conveying direction.

However, in the case of a double facer with such pressurizing units, since the pressurizing units are disposed in a separate condition to make a single faced corrugated fiberboard sheet 4 and a front linerboard 1 (a double faced corrugated fiberboard sheet 5 is produced when they are adhered to each other) susceptibly exposed to the outside air so that the function to remove the moisture from the single faced corrugated fiber sheet 4 and the front linerboard 1 improves, the double faced corrugated fiberboard sheet 5 existing on the immediate downstream side of the double facer has a tendency to have a high temperature and a low moisture. For this reason, the moisturizing method based upon the above-mentioned sheet wetting apparatus can not accomplish the sufficient humidification for the sheet and can not conduct the fine control of the moisture supply quantity, and therefore, difficulty exists in certainly suppressing the warps of the sheets occurring with the passage of time.

SUMMARY OF THE INVENTION

The present invention has been developed with a view to eliminating above-mentioned problems, and it is therefore an object of this invention to provide a corrugator and corrugated fiberboard sheet manufacturing method which are capable of accurately adjusting a moisture supply quantity in accordance with a moisture of a sheet so that the sheet passage-of-time warp deformation is surely suppressible.

For this purpose, in accordance with this invention, there is provided a corrugator having an adhering section equipped with a plurality of pressurizing units separately disposed in series along a sheet conveying direction, where a front linerboard and a rear linerboard are adhered to each other to form a corrugated fiberboard sheet, and the corrugated fiberboard sheet formed at the adhering section is processed into a predetermined configuration in a processing section standing on the downstream side of the adhering section, the corrugator comprising sensor means placed on the upstream side of the processing section for detecting a moisture content condition of each of the front linerboard and the rear linerboard, moisturizing means provided on the upstream side of the sensor means and on the downstream side of the adhering section for directly supplying moisture to a surface of each of the front linerboard and the rear linerboard, and a controller for setting a moisture quantity to be supplied from the moisturizing means on the basis of detection information from the sensor means.

With this arrangement, the sensor means measures the moisture content condition of each of the front and rear linerboards of the corrugated fiberboard sheet so that the moisturizing means supplies moisture to the sheet on the basis of the measurement information, and therefore, the moisture of the front linerboard side and rear linerboard side of the corrugated fiberboard sheet immediately after the adhering section can accurately reach a desired moisture close to the equilibrium moisture.

Accordingly, even in the case that a plurality of pressurizing units are separately disposed along the sheet conveying direction to make the corrugated fiberboard sheet on the immediate downstream side of the adhering section tend to show a high temperature and a low moisture, sufficient humidification for the sheet is possible and the fine control of the moisture supply quantity is feasible, thereby surely suppressing the passage-of-time warp deformation.

Furthermore, in accordance with this invention, there is provided a corrugator having an adhering section including a heating section and a cooling section to heat, cool and adhere a front linerboard and a rear linerboard to form a corrugated fiberboard sheet, with the corrugated fiberboard sheet formed in the adhering section being processed into a predetermined configuration in a processing section existing on the downstream side of the adhering section, the corrugator comprising sensor means provided between the processing section and the cooling section for detecting a moisture content condition of each of the front linerboard and the rear linerboard, moisturizing means provided between the heating section and the cooling section for directly supplying moisture to a surface of each of the front linerboard and the rear linerboard, and a controller for setting a moisture quantity to be supplied from the moisturizing means on the basis of detection information from the sensor means.

Likewise, the sensor means measures the moisture content condition of each of the front and rear linerboards of the corrugated fiberboard sheet so that the moisturizing means supplies moisture to the sheet on the basis of the measurement information, and therefore, the moisture of the front linerboard side and rear linerboard side of the corrugated fiberboard sheet immediately after the adhering section can accurately reach a desired moisture close to the equilibrium moisture.

Accordingly, even in the case that a plurality of pressurizing units are separately disposed along the sheet conveying direction to make the corrugated fiberboard sheet on the immediate downstream side of the adhering section tend to show a high temperature and a low moisture, sufficient humidification for the sheet is possible and the fine control of the moisture supply quantity is feasible, thereby surely suppressing the passage-of-time warp deformation.

In the above-mentioned corrugator, preferably, the controller sets the moisture quantity to be given to the surface of each of the front linerboard and the rear linerboard on the basis of the desired moisture calculated in advance and the value measured by the sensor means.

More preferably, the controller calculates the desired moisture on the basis of the width of the corrugated fiberboard sheet, the sheet conveying speed and the basic weights of the front linerboard and the rear linerboard.

Furthermore, preferably, the sensor means is designed to detect the moisture content condition of the corrugated fiberboard sheet in its cross directions, while the moisturizing means supplies moisture with the moisture quantity being variable in the cross directions of the corrugated fiberboard sheet.

More preferably, the sensor is constructed to be allowed to reciprocate (oscillate) in the cross directions of the corrugated fiberboard sheet. In addition, it is also preferable that a plurality of sensors each equivalent to the sensor means are placed at a given interval in the cross directions of the corrugated fiberboard sheet.

Still further, preferably, the moisturizing means is equipped with a plurality of spray units disposed at a given interval in the cross directions of the corrugated fiberboard sheet.

Thus, the spray units equally increase the moisture levels in the sheet to compensate for the shortage of the moisture in the cross directions of the front and rear linerboards, which allows the fine control of the moisture supply quantity to the sheet and the equal moisturization in the sheet cross directions.

Preferably, the moisturizing means is equipped with a plurality of watering roll units each including a water scooping blade disposed at a given interval in the cross directions of the corrugated fiberboard sheet.

Thus, the degree that the moisture attachment quantity to the sheet depends upon the machine speed decreases, so that a relatively-large amount of moisture is easily and constantly attachable to the sheet.

Moreover, it is preferable that the corrugator further comprises second moisturizing means situated between the first-mentioned moisturizing means and the sensor means for equalizing the moisture content level in each of the front linerboard and the rear linerboard.

With this construction, the first-mentioned moisturizing means equally increases the moisture level in the sheet while the second moisturizing means supplies the undermoisture (the storage of moisture) in the cross directions of the front and rear linerboards. Accordingly, it is possible to eliminate the shortage of the moisture attachment quantity to the sheet due to the increase in the machine speed, with the result that the fine control of the moisture supply quantity and the equal moisture supply in the cross directions become feasible.

Preferably, the second moisturizing means is equipped with a spray unit or a watering roll unit including a water scooping blade.

In addition, the present invention provides a corrugated fiberboard sheet manufacturing method of producing a corrugated fiberboard sheet by adhering a front linerboard to a rear linerboard in an adhering section including a plurality of pressurizing units separately disposed in series along a sheet conveying direction and further of processing the corrugated fiberboard sheet produced in the adhering section into a predetermined configuration in a processing section, the corrugated fiberboard sheet manufacturing method comprising the steps of: detecting a moisture content condition of each of the front linerboard and the rear linerboard on the upstream side of the processing section through the use of sensor means; setting a moisture quantity to be supplied to a surface of each of the front linerboard and the rear linerboard on the basis of the moisture content condition detected through the sensor means; and supplying the set moisture quantity on the upstream side of the sensor means and on the downstream side of the adhering section through the use of moisturizing means.

According to this method, the moisture content conditions of front and rear linerboards of a corrugated fiberboard sheet are measured through the sensor means and the moisture supply to the sheet is done through the moisturizing means on the basis of the measurement information, which makes the moisture of each of the front and rear linerboard sides of the corrugated fiberboard sheet immediately after the adhering section reach a desired moisture close to the equilibrium moisture.

Accordingly, even in the case that a plurality of pressurizing units are separately disposed along the sheet conveying direction to make the corrugated fiberboard sheet on the immediate downstream side of the adhering section tend to show a high temperature and a low moisture, sufficient humidification for the sheet is possible and the fine control of the moisture supply quantity is feasible, thereby surely suppressing the passage-of-time warp deformation.

Preferably, the moisture content condition to be detected through the sensor means is a moisture content condition in the cross directions of the corrugated fiberboard sheet, and the moisture quantity to be supplied to a surface of each of the front linerboard and the rear linerboard is set on the basis of the moisture content condition detected through the sensor means and a desired moisture value calculated in advance on the basis of the width of the corrugated fiberboard sheet, the sheet conveying speed and a basic weight of each of the front linerboard and the rear linerboard, and moisture corresponding to the set moisture quantity is given to the corrugated fiberboard sheet through the moisturizing means whereby the moisture quantity is variable in the cross directions of the corrugated fiberboard sheet.

Besides, the moisture content level in each of the front linerboard and the rear linerboard is equalized through the use of a second moisturizing means provided between the first-mentioned moisturizing means and the sensor means.

DESCRIPTION OF THE PREFERRED EMBODIMENTS

Embodiments of the present invention will be described hereinbelow with reference to the drawings.

Figure 1:
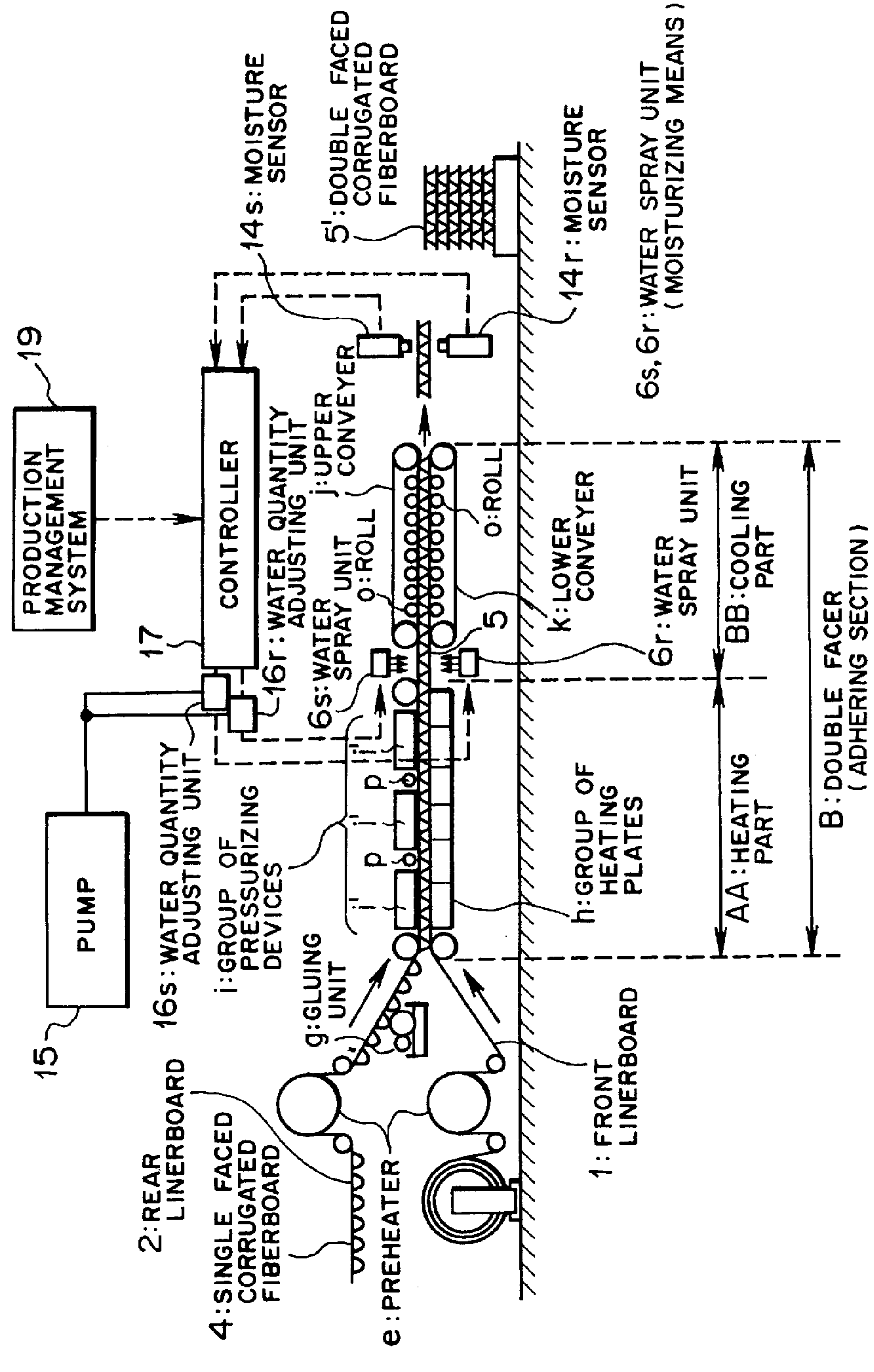
FIG. 1 is a side elevational view schematically showing a corrugator according to a first embodiment of the present invention.

First, a description will be made hereinbelow of a first embodiment of this invention. FIG. 1 is a side-elevational view schematically showing a corrugator according to the first embodiment of this invention.

As shown in FIG. 1, a double facer B of the corrugator according to the first embodiment is composed of a heating part AA and a cooling part BB which are located in a divided condition so that a single faced corrugated fiberboard sheet 4 heated by a preheater e standing on the upstream side of the double facer B and glued with a gluing unit g is adhered onto a front linerboard 1 heated by a preheater e existing on the upstream side of the double facer B, thus producing a double faced corrugated fiberboard sheet 5.

Figure 11:
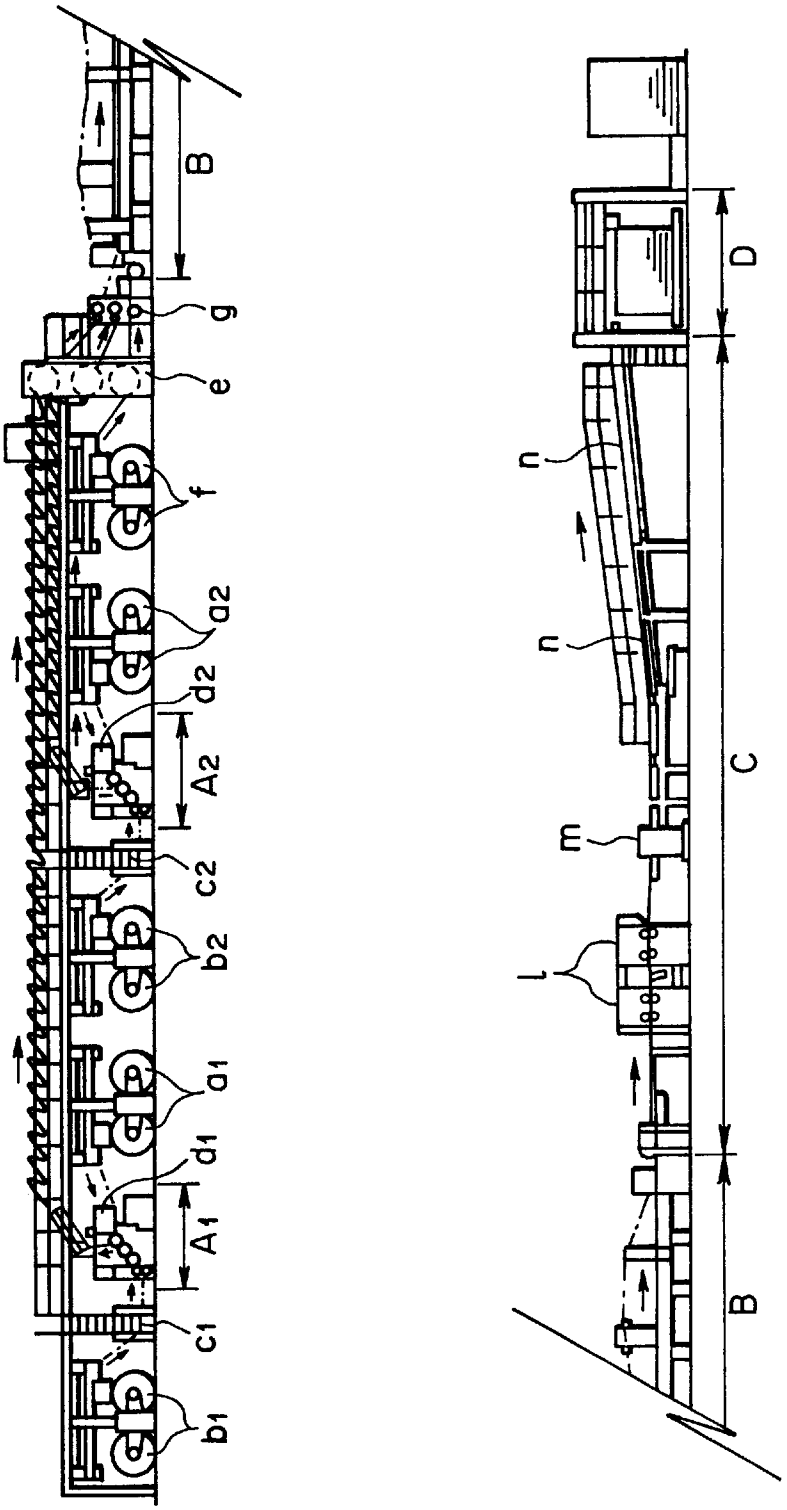
FIG.11 PRIOR ART
FIG. 11 is a side elevational view schematically showing a prior corrugator.
Figure 12:
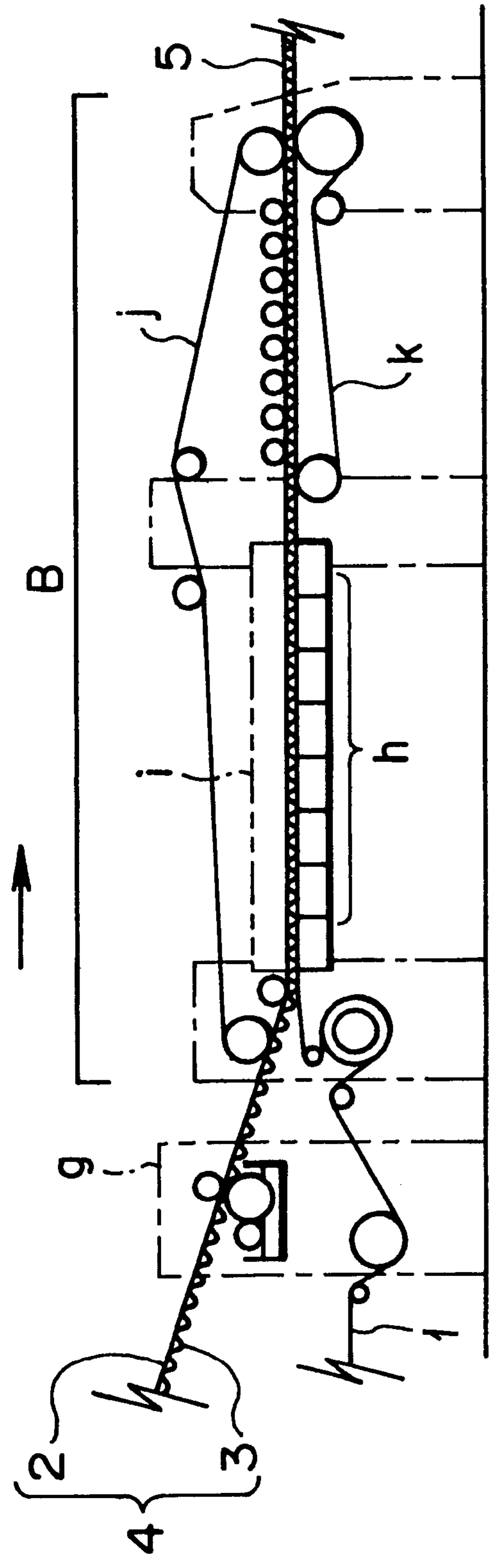
FIG.12 PRIOR ART
FIG. 12 is a side elevational view schematically showing a double facer of the prior corrugator.

Incidentally, in FIG. 1, arrows indicated by solid lines signify a conveying or carrying direction, and a processing section (not shown) including a slitter scorer 1 and a cut off m (see FIG. 11) and others for processing the double faced corrugated fiberboard sheet 5 produced in the double facer B is provided on the downstream side of the double facer B.

Furthermore, in this invention, the double facer B is referred to as an adhering section, because the front liner board 1 is adhered to a rear linerboard in this double facer B. In more detail, the heating part AA in the double facer B is sometimes referred in a narrow sense to as the adhering section, because the heating part AA of the double facer B takes the charge of the adhesion between the front linerboard 1 and the rear linerboard 2.

The heating part AA is for heating the single faced corrugated fiberboard sheet 4 and the front linerboard 1 while pressurizing them so that they are adhered to each other to form the double faced corrugated fiberboard sheet 5, and is equipped with a group of heating plates (heating box) h serving as heating members for heating the single faced corrugated fiberboard sheet 4 and the front linerboard 1 and a group of pressurizing devices i for pressurizing the single faced corrugated fiberboard sheet 4 and the front linerboard 1 on the group of heating plates h.

The group of heating plates h are constructed with a plurality of plate-like members to be properly heated in steam, and are made to heat the double faced corrugated fiberboard sheet 5 while coming into contact with the front linerboard 1 constituting the double faced corrugated fiberboard sheet 5.

Furthermore, the group of heating plates h are placed on a main frame (not shown) installed under both side sections of the double facer B to extend in the sheet conveying direction throughout the overall length of the double facer B.

On the other hand, as shown in FIG. 1, the group of pressurizing devices i are supported by a movable frame (not shown) placed above both the side sections of the double facer B to extend in the sheet conveying direction throughout the overall length of the double facer B and are disposed to be in an opposed relation to the group of heating plates h.

Figures 2A, 2B:
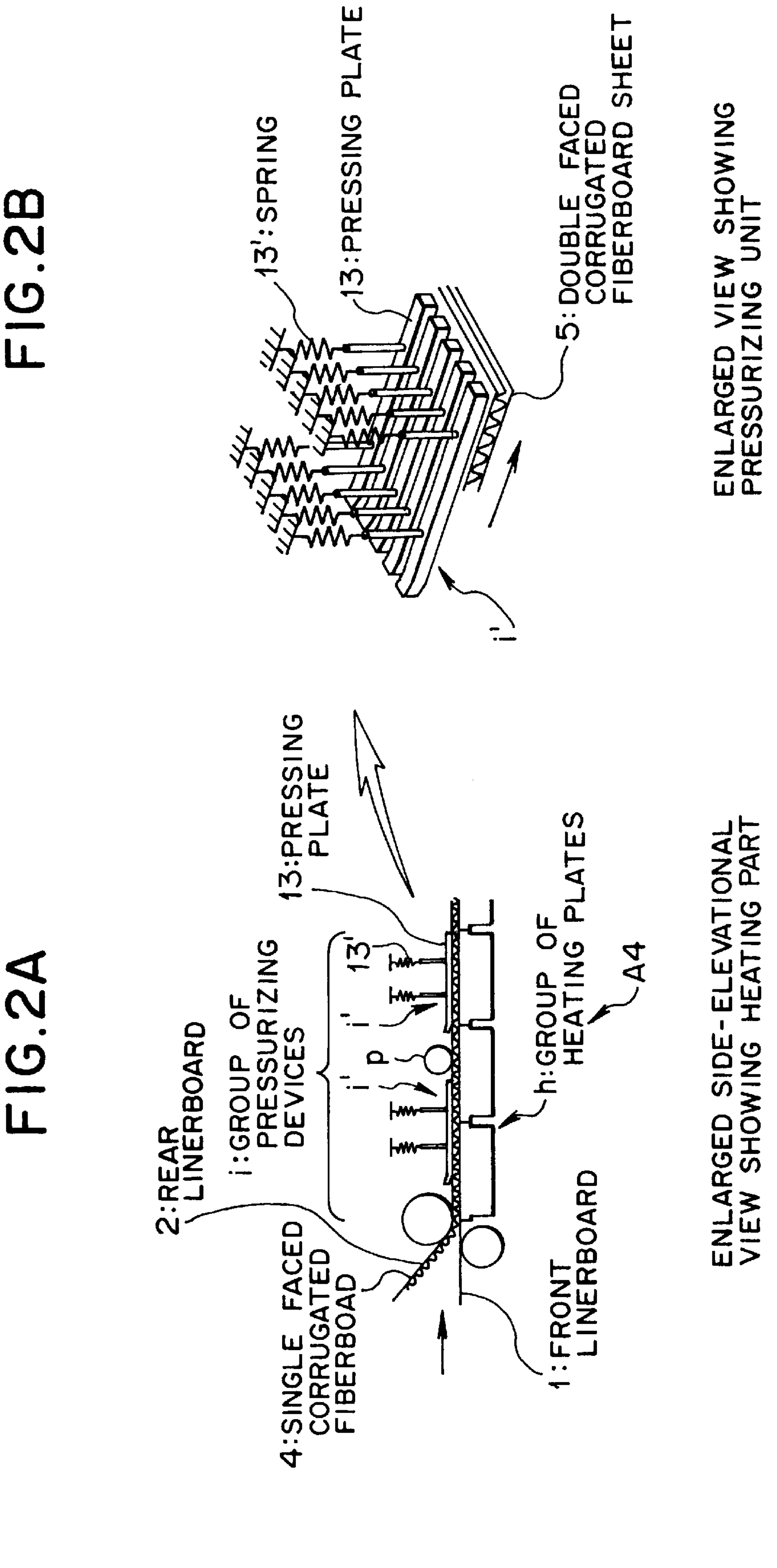
FIG. 2A is an illustration useful for explaining a heating part of the corrugator according to the first embodiment of this invention, and is an enlarged side elevational view schematically showing the heating part.
FIG. 2B is an illustration useful for explaining a heating part of the corrugator according to the first embodiment of this invention, and is an enlarged perspective view showing a pressurizing unit of the heating part.

As shown in FIG. 2A, the group of pressurizing devices i are constructed with a plurality of pressurizing devices i' separately disposed in series along the sheet conveying direction, with a given or predetermined interval being defined between these pressurizing device i'. This is because of improving the function to remove (evaporate) the moisture staying within the double faced corrugated fiberboard sheet 5 at the adhesion between the single faced corrugated fiberboard sheet 4 and the front linerboard 1, thereby equalizing the drying condition of the glue applied between the single faced corrugated fiberboard sheet 4 and the front linerboard 1.

As shown in FIG. 2B, these pressurizing devices i' are structured such that pressing plates 13 suspended through springs 13' are arranged in the cross directions. Thus, the respective pressing plates 13 extend in the sheet conveying direction and take the parallel relation to each other.

Furthermore, as shown in FIG. 1, each of sheet feeding devices p is placed between the plurality of pressurizing devices i' thus disposed at an interval in the sheet conveying direction, and at the beginning of the manufacturing of the double faced corrugated fiberboard sheet 5, they advance the leading portions of the single faced corrugated fiberboard sheet 4 and the front linerboard 1 so that the leading portions thereof are introduced between an upper conveyer j and a lower conveyer k constituting the cooling part BB.

This cooling part BB is, as shown in FIG. 1, equipped with the upper and lower conveyers j, k which function as a sheet conveying means. Each of these upper and lower conveyers j, k is located in a state of being equally divided to define a constant gap between the divisions in the cross directions. In addition, each of these upper and lower conveyers j, k is equipped with a plurality of rolls o, and these rolls o are made to pressurize the rear surface of a belt of each of the upper and lower conveyers j, k.

With this construction, the double faced corrugated fiberboard sheet 5 produced in the heating part AA is put between the upper conveyer j and the lower conveyer k, and carried to be cooled while being pressurized by the plurality of rolls o.

Secondly, a description will be made hereinbelow of a sheet wetting apparatus of the corrugator according to this embodiment. This sheet wetting apparatus is for the purpose of preventing the passage-of-time warp deformation of the double faced corrugated fiberboard sheet.

As shown in FIG. 1, this sheet wetting apparatus is composed of moisture sensors 14*s*, 14*r* placed on the immediate downstream side of the double facer B and on the upstream side of the non-shown processing section, water spray units (moisturizing means) 6*s*, 6*r* located between the heating part AA and the cooling part BB, a controller 17, water quantity adjusting units 16*s*, 16*r*, and a pump 15.

The reason why the moisture sensors 14*s*, 14*r* are located on the downstream side of the moisturizing means such as the water spray units 6*s*, 6*r* in a state where the cooling part BB is interposed therebetween is as follows.

That is, it takes some time from when the moisturizing means such as the water spray units 6*s*, 6*r* supplies moisture to the double faced corrugated fiberboard sheet 5 until the moisture spreads itself into the interior of the paper of the double faced corrugated fiberboard sheet 5. On the other hand, the moisture sensors 14*s*, 14*r* are desired to detect the moisture condition of the double faced corrugated fiberboard sheet 5 in a state where the moisture percolates through the interior of the paper.

Accordingly, for detecting the moisture of the double faced corrugated fiberboard sheet 5 being in a desired condition through the use of the moisture sensors 14*s*, 14*r*, it is required that the moisture sensors 14*s*, 14*r* are located on the downstream side of the moisturizing means such as the water spray units 6*s*, 6*r* to be separated by a given distance therefrom.

Besides, in this case, the given distance depends upon the time taken until the moisture percolates through the interior of the paper of the double faced corrugated fiberboard sheet 5 after the moisture supply and the conveying speed of the double faced corrugated fiberboard sheet 5.

In this construction, the moisture sensors 14*s*, 14*r* are located on the downstream side of the moisturizing means such as the water spray units 6*s*, 6*r* in a state where the cooling part BB is put therebetween, so that the moisture sensors 14*s*, 14*r* are separated on the downstream side by a given distance from the moisturizing means such as the water spray units 6*s*, 6*r*. Off-course, it is also acceptable that the moisturizing means such as the water spray units 6*s*, 6*r* is installed on the downstream side of the cooling part BB and the moisture sensors 14*s*, 14*r* are separated on the downstream side by a given distance from this moisturizing means. In this case, the overall length of the double facer increases.

In either case, the moisturizing means such as the water spray units 6*s*, 6*r* and the moisture sensors 14*s*, 14*r* are needed to at least locate on the downstream side of the step (that is, the heating part AA) for the adhesion between the single faced corrugated fiberboard sheet 4 and the front linerboard 1, and further, the moisture sensors 14*s*, 14*r* are required to place on the downstream side by a given distance from the moisturizing means such as the water spray units 6*s*, 6*r*.

The moisture sensor 14*s* lies on the single faced corrugated fiberboard sheet 4 side while the moisture sensor 14*r* stands on the front linerboard 1 side. In addition, the water spray unit 6*s* is on the single faced corrugated fiberboard sheet 4 side while the water spray unit 6*r* is on the front linerboard 1 side.

A non-contact infrared moisture meter can be used as the moisture sensors 14*s*, 14*r*, while a one-fluid type spray nozzle or two-fluid type spray nozzle can be used as the water spray units 6*s*, 6*r*. Further, a proportional solenoid valve can be used as the water quantity adjusting units 16*s*, 16*r*.

Figure 3:
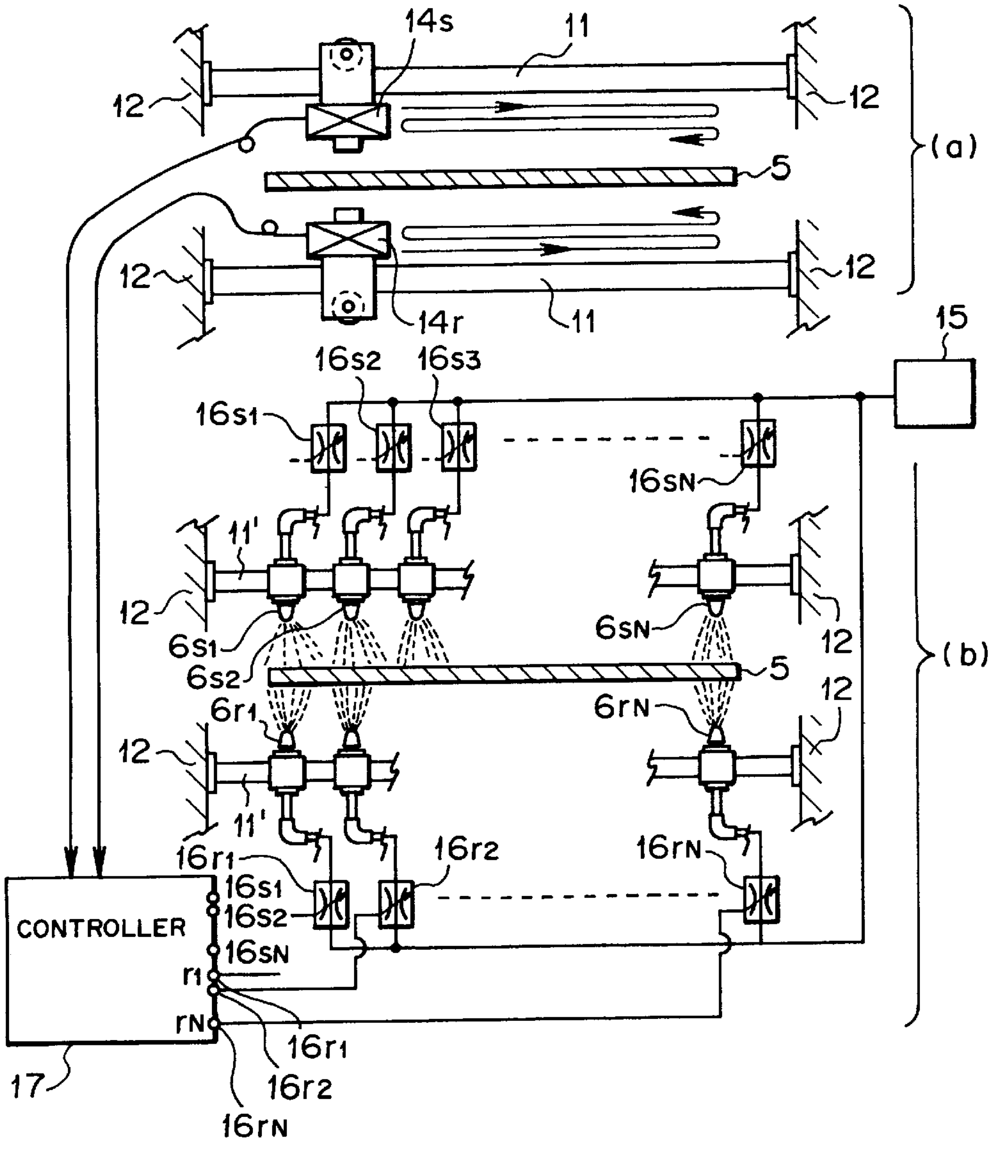
FIG. 3 is an illustration of the corrugator according to the first embodiment of this invention, and a section indicated by (a) in FIG. 3 shows moisture sensors and a section indicated by (b) in FIG. 3 illustrates a sheet wetting apparatus including water spray units.

FIG. 3 shows a sheet wetting apparatus for achieving the object of this invention in a manner of equalizing the moisture distribution of the double faced corrugated fiberboard sheet 5 in its cross directions.

As shown in FIG. 3, the moisture sensors 14*s*, 14*r* are installed to be movable in transverse directions along bars 11, 11 fixedly secured onto a frame 12 to extend throughout a machine width in a given inter-machine space within the corrugator so that the moisture (which will sometimes be referred hereinafter to as a moisture content) on each of the single faced corrugated fiberboard sheet 4 side and the front linerboard 1 side is measurable.

Furthermore, as shown by arrows in FIG. 3, the moisture sensors 14*s*, 14*r* are made to continuously move back and forth to continuously measure the paper cross-direction moisture distributions of the traveling double faced corrugated fiberboard sheet 5. The moisture measurement signals from these moisture sensors 14*s*, 14*r* go into the controller 17.

Incidentally, the moisture sensors 14*s*, 14*r* are not limited to this, but it is also appropriate that a plurality of moisture sensors are arranged at a given interval in the paper cross directions so that the moisture values in the paper cross directions are detected on a spot-by-spot basis without the movement of the moisture sensors.

As shown in FIG. 3, the water spray unit (water discharging unit) 6*s* comprises a plurality of water sprays placed at a given interval in the sheet cross directions to spray water toward the single faced corrugated fiberboard sheet 4 side of the double faced corrugated fiberboard sheet 5, thereby supplying moisture to each of areas appearing in the paper cross directions. That is, according to this structure, for supplying the moisture, the moisture quantity is variable in the cross directions of the corrugated fiberboard sheet 4. In FIG. 3, reference numerals $\mathbf{6}s_1$ to $\mathbf{6}s_N$ are allocated to the plurality of water sprays 6*s*, respectively.

On the other hand, as shown in FIG. 3, the water spray unit (water discharging unit) 6*r* comprises a plurality of water sprays placed at a given interval in the sheet cross directions to spray water toward the front linerboard 1 side of the double faced corrugated fiberboard sheet 5 for supplying moisture to each of areas appearing in the paper cross directions. That is, according to this structure, for supplying the moisture, the moisture quantity is variable in the cross directions of the corrugated fiberboard sheet 4. In FIG. 3, reference numerals $\mathbf{6}r_1$ to $\mathbf{6}r_N$ are allocated to the plurality of water sprays 6*r*, respectively.

These water sprays $\mathbf{6}s_1$ to $\mathbf{6}s_N$ and $\mathbf{6}r_1$ to $\mathbf{6}r_N$ are placed at a substantially equal interval on bars 11', 11' fixed to the frame 12.

These sprays $\mathbf{6}s_1$ to $\mathbf{6}s_N$ and $\mathbf{6}r_1$ to $\mathbf{6}r_N$ are respectively coupled through their piping systems to water quantity adjusting devices (which are also called discharge quantity adjusting devices or flow rate adjusting devices) $\mathbf{16}s_1$ to $\mathbf{16}s_N$ and $\mathbf{16}r_1$ to $\mathbf{16}r_N$ of the water quantity adjusting units 16*s*, 16*r* which in turn, are connected to the pump 15 acting as a liquid (in this case, water) supply source. The controller 17 individually issues a command signal to each of these water quantity adjusting devices $\mathbf{16}s_1$ to $\mathbf{16}s_N$ and $\mathbf{16}r_1$ to $\mathbf{6}r_N$ so that they are controlled in accordance with the command signals therefrom to adjust the water quantities to be fed from the pump 15. Whereupon, an adequate water quantity flows toward each of the water spray units 6*s*, 6*r*.

The controller 17 receives the moisture measurement values from the moisture sensors 14*s*, 14*r* and the kind of paper [the basic weight [paper weight per sheet of 1 $m^2$) P] and the machine speed V from the production management system 19 to calculate a moisture supply quantity corresponding to the desired moisture, and emits signals corresponding to the calculated moisture supply quantity to the water quantity adjusting units 16s, 16r.

Figure 4A:
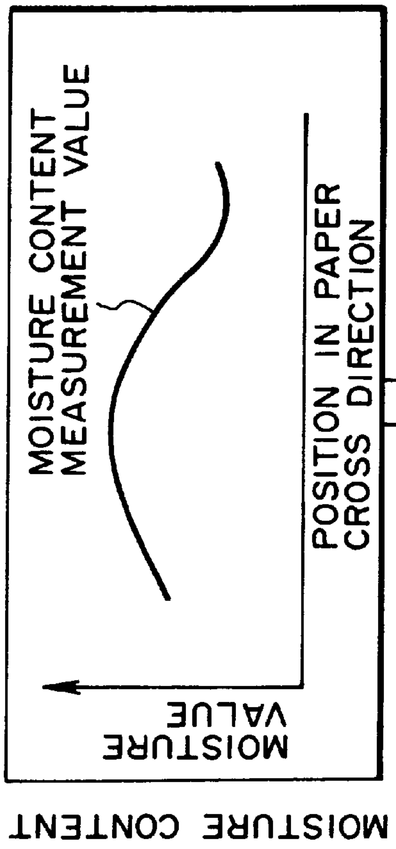
FIG. 4A is an illustration useful for describing a moisture supply quantity in sheet cross directions in the corrugator according to the first embodiment of this invention, that is, showing one example of distribution patterns of the moisture measurement values in the paper cross directions which are measured by the moisture sensors.
Figure 4B:
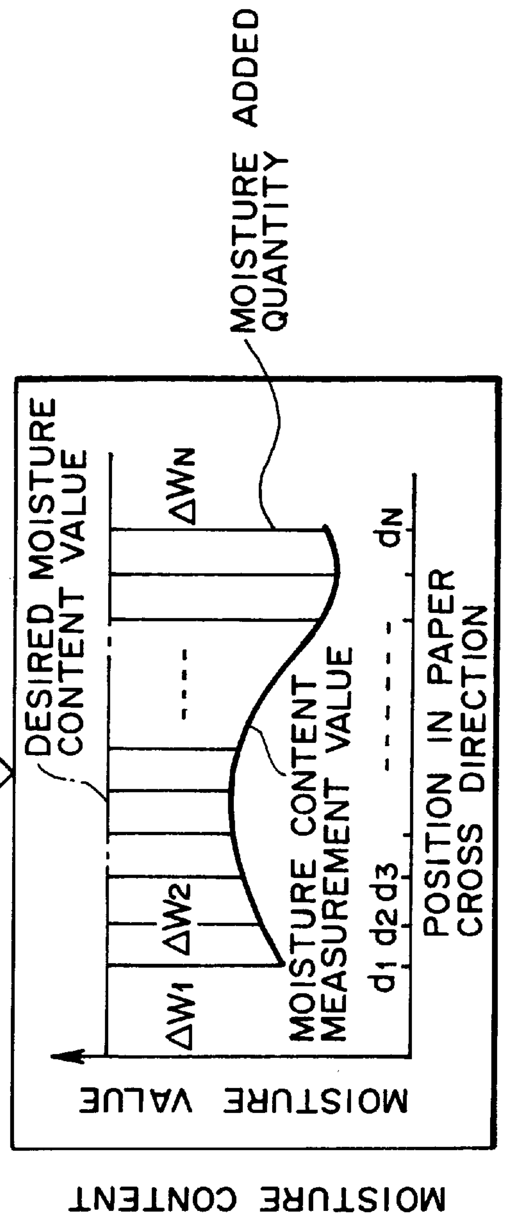
FIG. 4B is an illustration useful for describing a moisture supply quantity in sheet cross directions in the corrugator according to the first embodiment of this invention, showing the supplemental moisture added quantities at the positions in the paper cross directions which are required with respect to the moisture measurement values in FIG. 4A in order to achieve the desired moisture.

Referring now to FIGS. 4A and 4B, a description will be taken hereinbelow of an operation to be conducted in the controller 17. In FIGS. 4A and 4B, their horizontal axes show the positions in the paper cross directions while their vertical axes represent the moisture measurement values.

FIG. 4A illustrates one example of distribution patterns of the moisture measurement values (which is also referred to as moisture values) in the paper cross directions which are measured by the moisture sensors 14s, 14r, while FIG. 4B shows the supplemental moisture added quantities $\Delta w_1$ to $\Delta w_N$ at the positions $d_1$ to $d_N$ in the paper cross directions which are required with respect to the moisture measurement values in FIG. 4A in order to achieve the desired moisture.

The desired moisture signifies the moisture condition required on the immediate downstream side of the double facer B in order to bring the double faced corrugated fiberboard sheet 5 coming in a stacking section into the moisture equilibrium condition, the moisture value to be taken for achieving the desired moisture is referred to as a desired moisture value.

Figure 5:
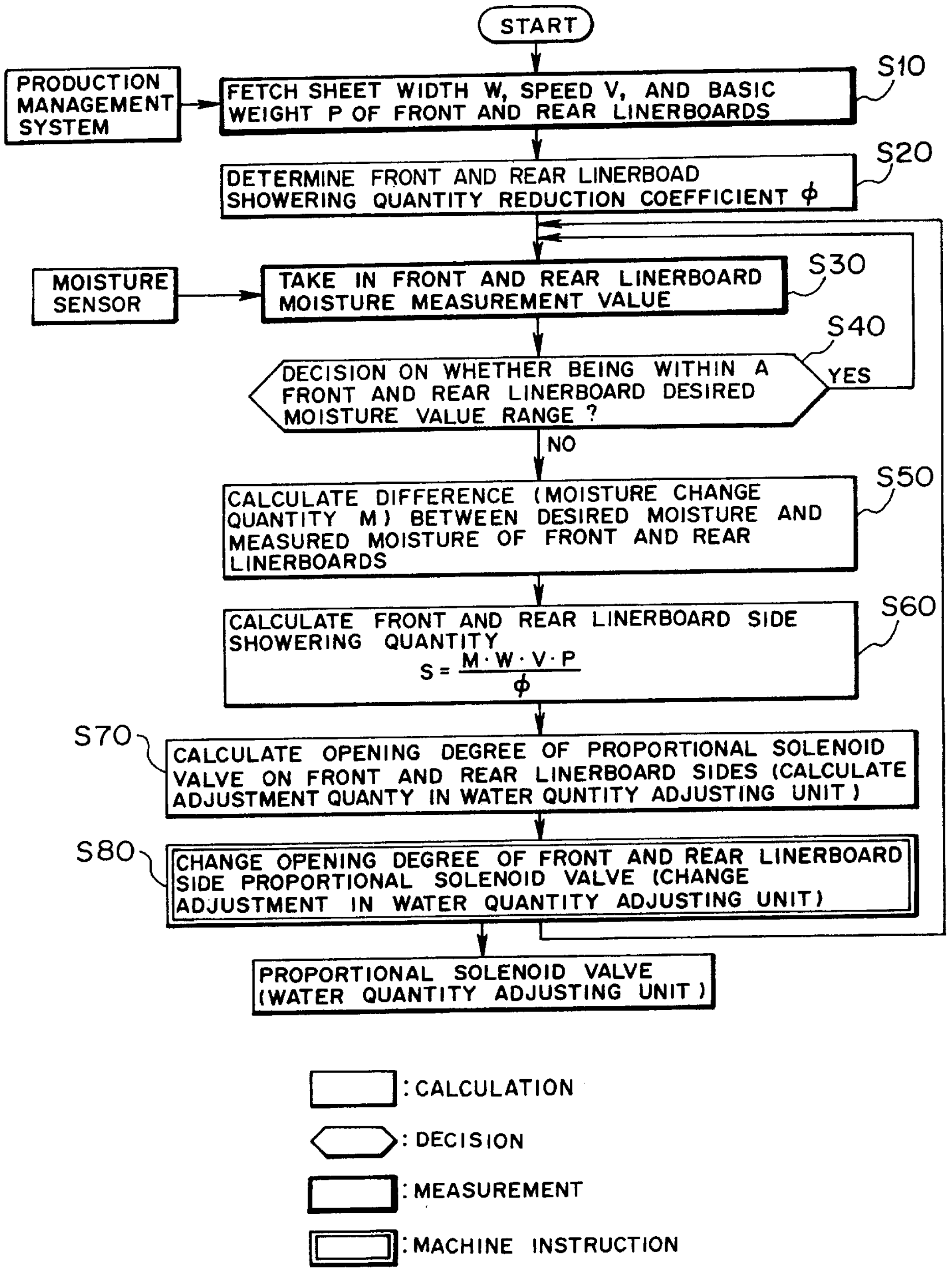
FIG. 5 is a flow chart showing water supply control by a controller of the corrugator according to the first embodiment of this invention.

Furthermore, an operation to be conducted in the controller 17 will be described hereinbelow with reference to the flow chart of FIG. 5.

First, in the operation, the controller 17 begins with a step S10 to receive a sheet (double faced corrugated fiberboard sheet) width W, a sheet conveying speed (machine speed) V and basic weights P of the front linerboard 1 and the rear linerboard 2 from the production management system 19, and advances to a step S20 to determine a showering quantity reduction coefficient $\phi$ corresponding to the sheet conveying speed V, and then proceeds to a step S30.

The showering quantity reduction coefficient $\phi$ is a coefficient set to make the moisture supply quantity to the sheet constant irrespective of the increase in the sheet conveying speed V, because an air layer occurs on the sheet surface with the increase in the sheet conveying speed V to reduce the moisture attachment quantity to the sheet.

In the step S30, the controller 17 fetches the moisture measurement values of the front linerboard 1 and the rear linerboard 2 from the moisture sensors 14s, 14r existing on the immediate downstream side of the double facer B, and subsequently, proceeds to a step S40 to decide whether or not these moisture measurement values are within a desired moisture range (that is, the difference thereof from a desired moisture value is minute).

The decision result shows that the moisture measurement values are within the desired moisture range, the operational flow returns to the step S30 to retrieve the next moisture measurement values of the front linerboard 1 and the rear linerboard 2. On the other hand, if being not within the desired moisture range, the operational flow goes to a step S50 to calculate the difference (moisture change quantity M) between the desired moisture value and the moisture measurement values, then followed by a step S60.

The step S60 is for calculating a showering quantity (moisture supply quantity) S to the front and rear linerboards. The showering quantity S is a water quantity per unit time, and given by the following equation (1).

$$S = M \cdot W \cdot V \cdot P / \phi \quad (1)$$

Following this, the operational flow advances to a step S70 to calculate adjustment quantities (for example, the opening degrees of the proportional solenoid valves) of the front and rear linerboard side water quantity adjusting units 16s, 16r, and then proceeds to a step S80 to change the adjustment quantities (for example, the opening degrees of the proportional solenoid valves) of the water quantity adjusting units 16s, 16r, so that the water quantity adjusting units 16s, 16r are controlled in accordance with the changed adjustment quantities. Thereafter, the operational flow returns to the step S30 to repeatedly conduct this procedure so that the moisture of the front and rear linerboards 1, 2 on the immediate downstream side of the double facer B approaches the equilibrium moisture, thereby reducing the difference in moisture between the front and rear linerboards.

Figure 13:
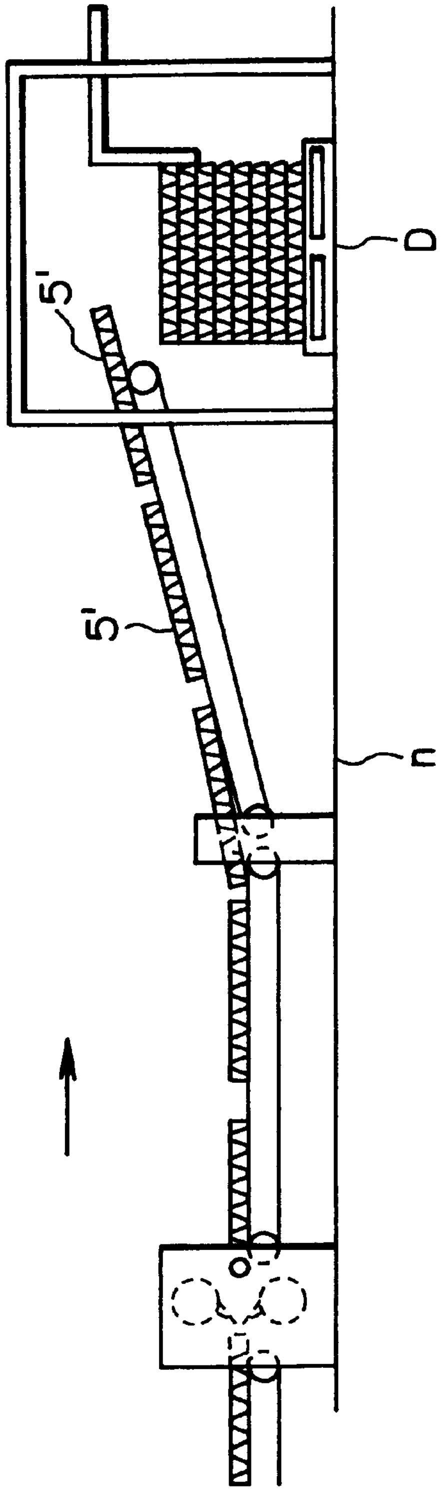
FIG. 13 PRIOR ART
FIG. 13 is a side elevational view schematically showing a stacker and a stacking section in the prior corrugator.
Figure 14:
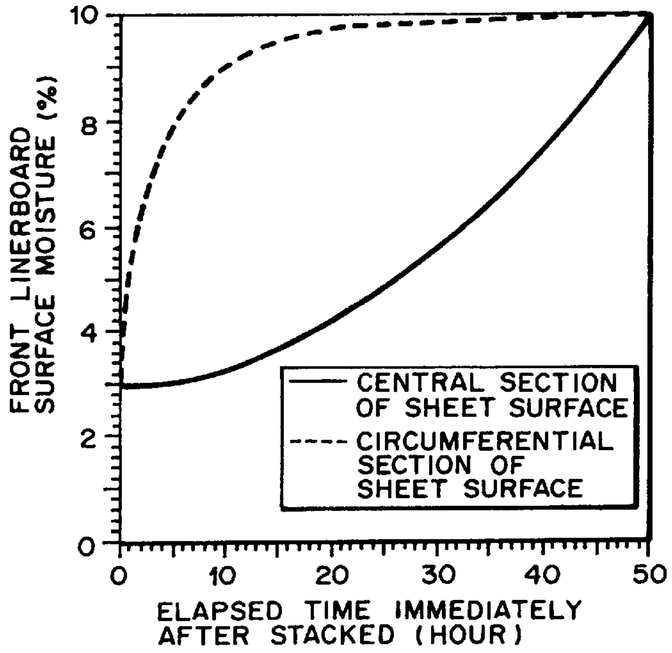
FIG. 14 PRIOR ART
FIG. 14 is an illustration of the measurement results of moisture variation in a linerboard surface circumferential section and a linerboard surface central section of a corrugated fiberboard sheet manufactured by the prior corrugator and stacked in the stacking section.
Figure 15:
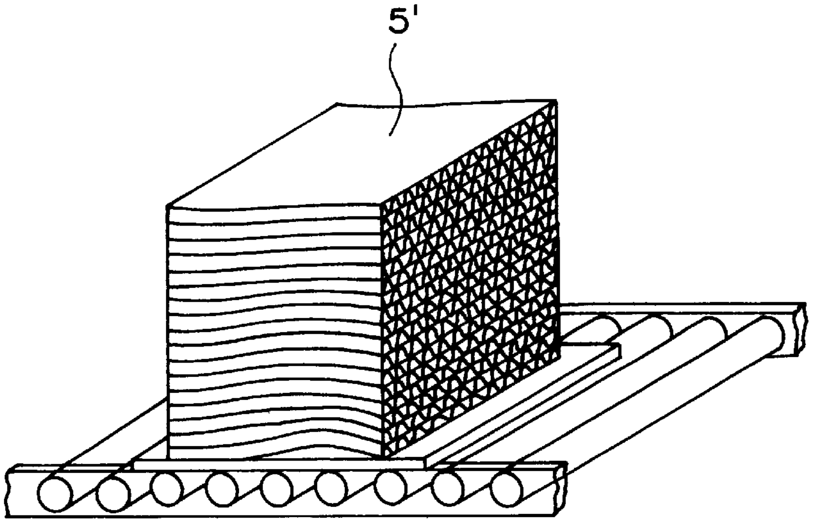
FIG. 15 PRIOR ART
FIG. 15 is a perspective view showing corrugated fiberboard sheets manufactured and stacked by the prior corrugator.
Figure 16:
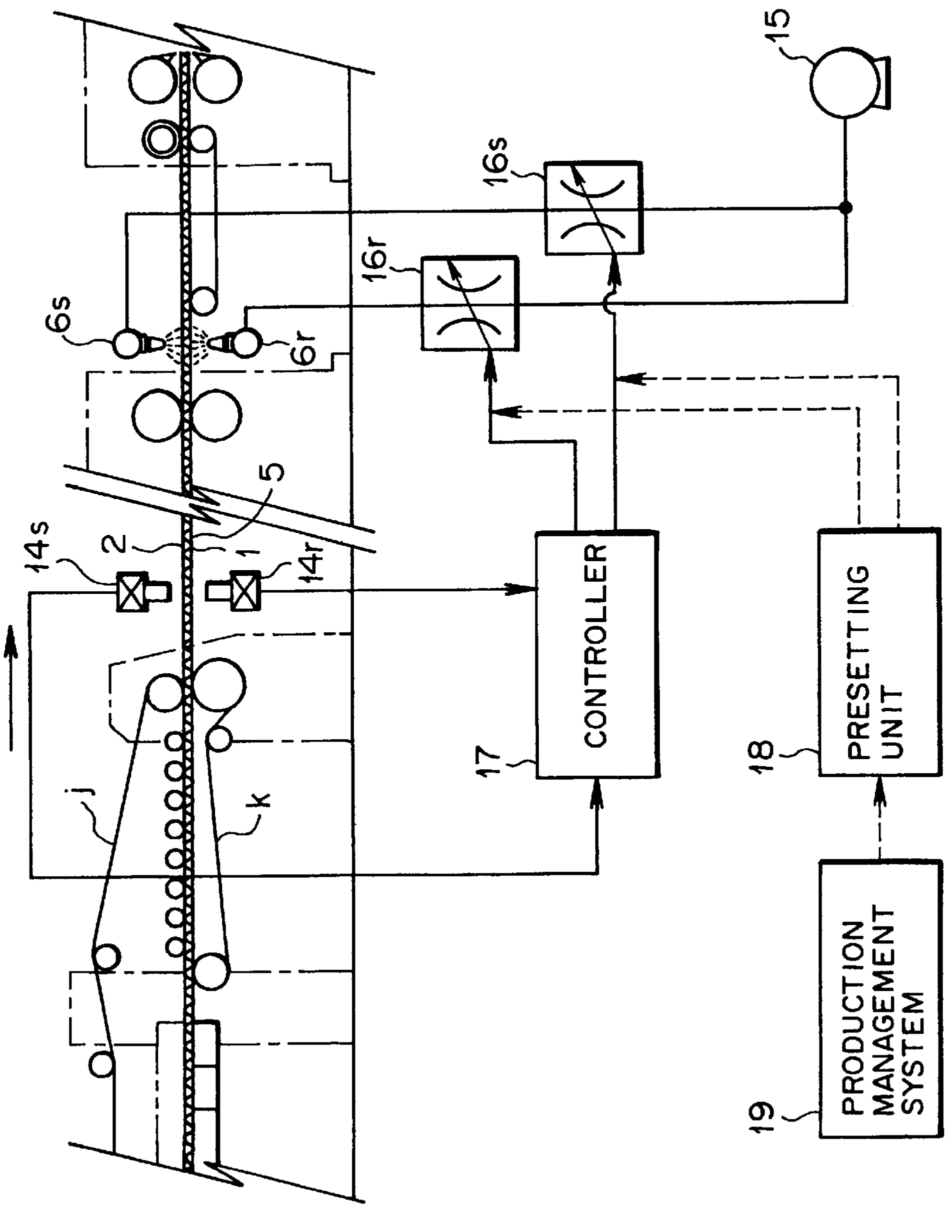
FIG.16 PRIOR ART
FIG. 16 is an illustration of a sheet wetting apparatus of the prior corrugator.
Figure 17:
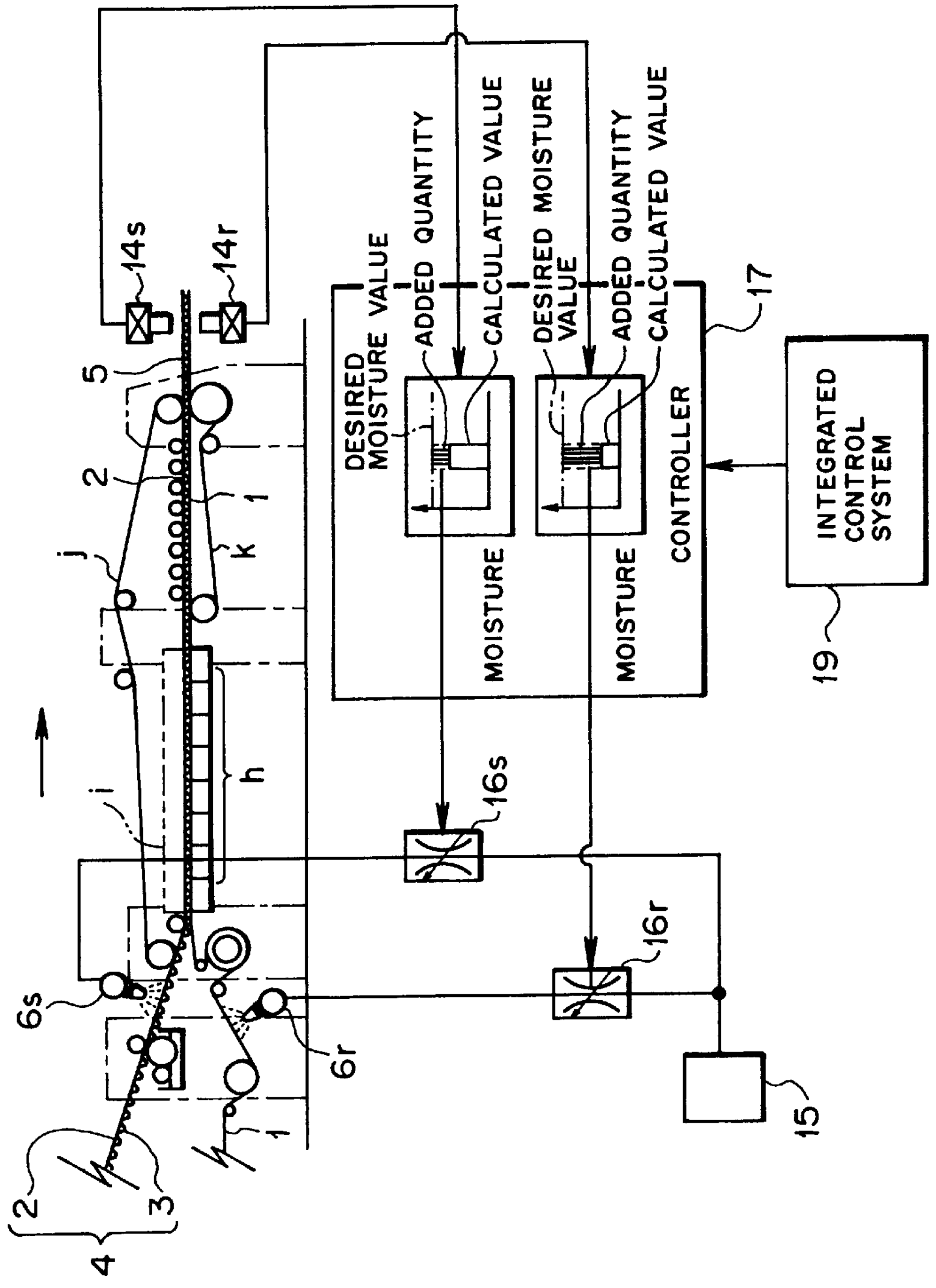
FIG. 17 PRIOR ART
FIG. 17 is an illustration of a sheet wetting apparatus of a prior corrugator.
Figure 18:
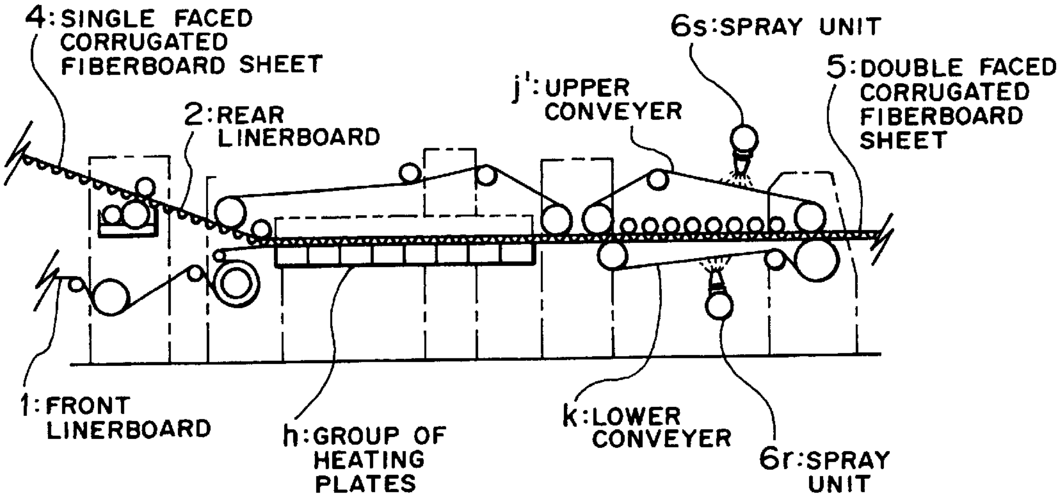
FIG. 18 PRIOR ART
FIG. 18 is an illustration of a sheet wetting apparatus of a prior corrugator.

Thus, since the moisture level can equally increase in the sheet cross directions, when being processed in the processing section and stacked in the stacking section D (see FIG. 13), the double faced corrugated fiberboard sheet 5' immediately before being stacked is equally brought into the equilibrium moisture over the entire surfaces of the front and rear linerboards, and then stacked in this condition.

The sheet wetting apparatus according to the first embodiment of this invention is constructed as described above, and executes an control operation for the prevention of the passage-of-time warp deformation as follows as a corrugated fiberboard manufacturing method according to this embodiment.

First, the controller 17 sets a desired moisture value for each of the single faced corrugated fiberboard sheet 4 side and the front linerboard 1 side on the immediate downstream side of the cooling part BB, and fetches the single faced corrugated fiberboard sheet 4 side moisture measurement value the moisture sensor 14s obtains, the front linerboard 1 side moisture measurement value the moisture sensor 14r gets, and the front and rear linerboard basic weight data and machine speed the production management system 19 retains, to calculate a moisture supply quantity to the double faced corrugated fiberboard sheet 5 for providing the desired moisture thereto.

Furthermore, through the use of the water quantity adjusting units 16s, 16r, the flow rate adjustment is accomplished on the basis of the calculated moisture supply quantity, and through the use of the water spray units 6s, 6r, the moisture supply is made to the front linerboard 1 side and rear linerboard 2 side of the double faced corrugated fiberboard sheet 5.

Figure 6A:
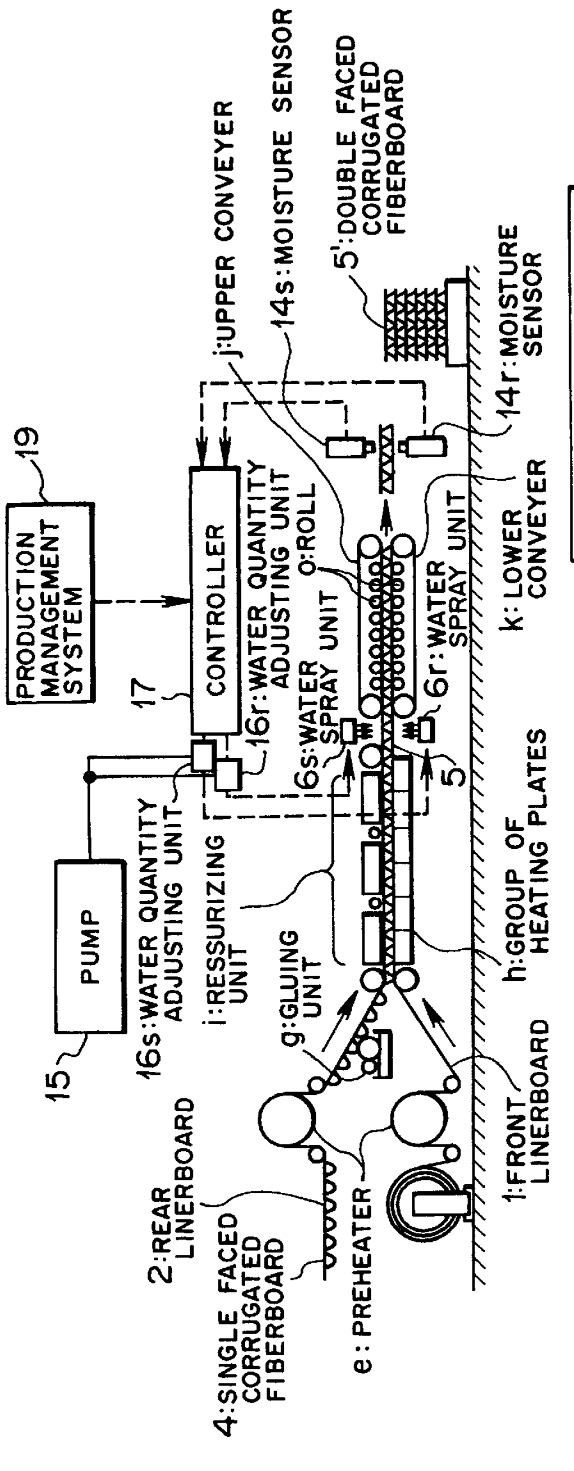
FIG. 6A is an illustration useful for describing the variation of a sheet temperature and moisture of a corrugated fiberboard sheet manufactured by the corrugator according to the first embodiment of this invention, and is a side-elevational view schematically showing the corrugator.
Figure 6B:
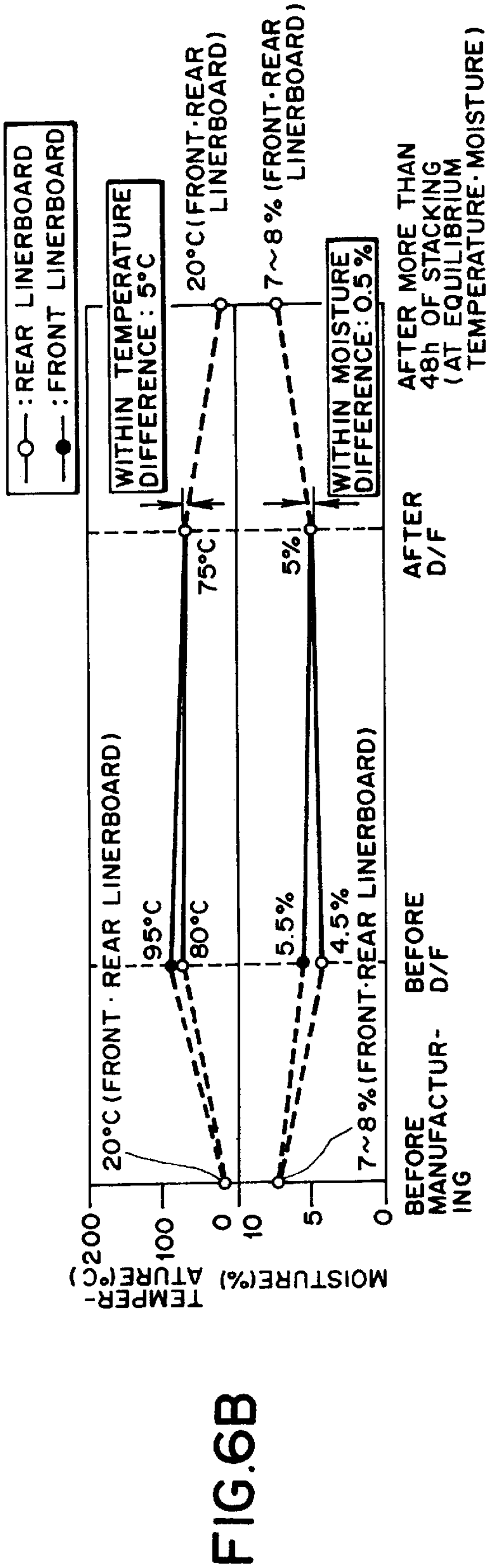
FIG. 6B is an illustration useful for describing the variation of a sheet temperature and moisture of a corrugated fiberboard sheet manufactured by the corrugator according to the first embodiment of this invention, and shows the sheet temperatures and moistures corresponding to portions of the corrugator shown in FIG. 6A

FIGS. 6A and 6B are illustrations of one example of the temperature and moisture measurement results which are obtained at portions of the corrugator in the case that the desired moisture on the immediate downstream side of the double facer B is set to 5% for the flow rate control.

As shown in FIG. 6B, usually, in the case of no execution of the flow rate control, on the immediate downstream side of the double facer B, the front linerboard moisture reaches approximately 3% while the rear linerboard moisture comes to approximately 4%. In this embodiment, owing to the flow rate control, the moisture of each of the front and rear linerboards on the immediate downstream side of the double facer B comes within a range of 5±0.5%.

Accordingly, the corrugator and corrugated fiberboard sheet manufacturing method according to the first embodiment of this invention can provide the following effects and advantages.

That is, the moisture sensors 14s, 14r measure the moisture content conditions of the front linerboard and the rear linerboard 2, and on the basis of the measurement results, the controller 17 and the production management system 19 calculate the shortage of moisture with respect to a desired moisture and a proper liquid supply quantity (flow rate) corresponding to this lacking moisture quantity. In addition, the water quantity adjusting units 16*s*, 16*r* adjust the quantities of the supply liquid so that the water spray units 6*s*, 6*r* wet the sheet accordingly. Whereupon, the sufficient humidification of the front linerboard 1 and the rear linerboard 2 becomes feasible and the fine control of the moisture supply quantity is possible, and hence, the moisture of the front and rear linerboards 1, 2 of the double faced corrugated fiberboard sheet 5 immediately after the double facer B can accurately reach the desired moisture close to the equilibrium moisture, and the difference in moisture between the front linerboard 1 and the rear linerboard 2 can come to almost zero.

Thus, even if a plurality of pressurizing devices i' are separately disposed along the sheet conveying direction, this construction ensures sufficient humidification of the sheet and permits the fine control of the moisture supply quantity, and therefore, the front linerboard 1 and the rear linerboard 2 can simultaneously approach the equilibrium temperature condition and the equilibrium moisture condition so that the upward or downward warp deformation thereof is preventable. Further, after the corrugated fiberboard sheets are stacked, the difference in moisture between the circumferential section and central section of the surface of each of the front and rear linerboards 1, 2 thereof is reducible, and hence, the expansions of the circumferential section and central section of the stacked sheet surface occurring from when the sheets are stacked until reaching the equilibrium moisture becomes substantially equal to each other, which prevent the occurrence of the buckling deformation in the sheet circumferential section and, further, can certainly suppress the wavy passage-of-time warp deformation.

Moreover, even in the case that the moisture supply quantity by the water spray units 6*s*, 6*r* exceeds or falls below the moisture supply quantity required for achieving the desired moisture, since the direct detection of the sheet moisture is possible, the moisture supply quantity to the sheet is accurately adjustable so that the wavy passage-of-time warp deformation of the sheet is suppressible.

Furthermore, since the moisture supply takes place after the adhesion between the single faced corrugated fiberboard sheet 4 and the front linerboard 1, no adhesion is made in an expansion changed condition, with the result that the occurrence of the warps is surely preventable.

Secondly, a description will be made hereinbelow of a second embodiment of the present invention.

Figure 7:
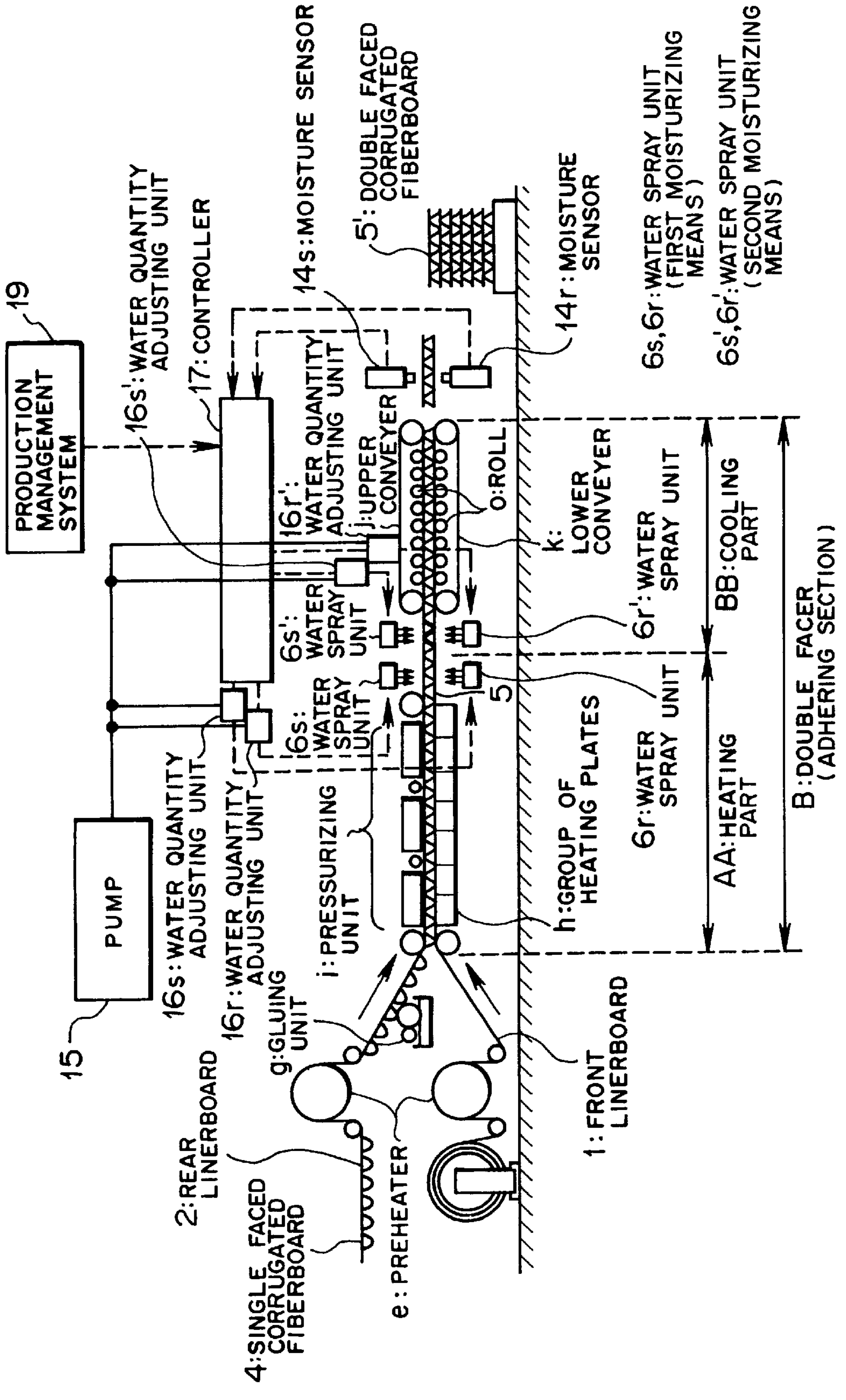
FIG. 7 is a side elevational view schematically showing a corrugator according to a second embodiment of this invention.

FIG. 7 is a side-elevational view schematically showing a corrugator according to the second embodiment of this invention.

The corrugator according to this second embodiment is, as shown in FIG. 7, constructed by adding a pair of water quantity adjusting units 16*s*', 16*r*' and a pair of water spray units (second moisturizing means) 6*s*', 6*r*' between a heating part AA and cooling part BB of a double facer B as compared with the above-described first embodiment.

In addition, these water quantity adjusting units 16*s*', 16*r*' are coupled to a pump 15 to adjust the quantity of water fed therefrom.

The pair of water spray units 6*s*', 6*r*' added are made to supply to the sheet the moisture corresponding to the moisture shortage in the cross directions of the front linerboard 1 and the rear linerboard 2 in order to equally increase the moisture level of the front linerboard 1 side and on the rear linerboard 2 side in the cross directions.

Subsequently, a description will be given hereinbelow of a control process in a sheet wetting apparatus for preventing the passage-of-time warp deformation which is a corrugated fiberboard sheet manufacturing method according to this embodiment.

First, as shown in FIG. 7, a controller 17 sets a desired moisture value for the single faced corrugated fiberboard sheet 4 side and the front linerboard I side on the immediate downstream side of the cooling part BB, and fetches a moisture measurement value of the single faced corrugated fiberboard sheet 4 side obtained by a moisture sensor 14*s*, a moisture measurement value of the front linerboard 1 side obtained by a moisture sensor 14*r*, and basic weight data of the front and rear linerboards 1, 2 and machine speed data from a production management system 19 to calculate the moisture supply quantity to the double faced corrugated fiberboard sheet 5 for achieving the desired moisture.

At this time, a pair of water spray units (first moisturizing means) 6*s*, 6*r* supply moisture to the sheet in order to equally increase the moisture level of the front linerboard 1 side and the rear linerboard 2 side in their cross directions, while the pair of water spray units 6*s*', 6*r*' added also supply the moisture to compensate for the moisture shortage (undermoisture) in the front linerboard 1 and the rear linerboard 2 in their cross directions.

Accordingly, with the corrugator and corrugated fiberboard sheet manufacturing method according to the second embodiment, in addition to the effects of the above-described first embodiment, it is possible to eliminate the shortage of the moisture attachment quantity to the sheet due to the increase in machine speed. Further, because of employing the moisture sheet supply method based upon the use of the sprays, the fine control of the moisture supply quantity is feasible and the uniform moisture supply in the sheet cross directions.

Furthermore, a description will be taken hereinbelow of a third embodiment of the present invention.

Figure 8:
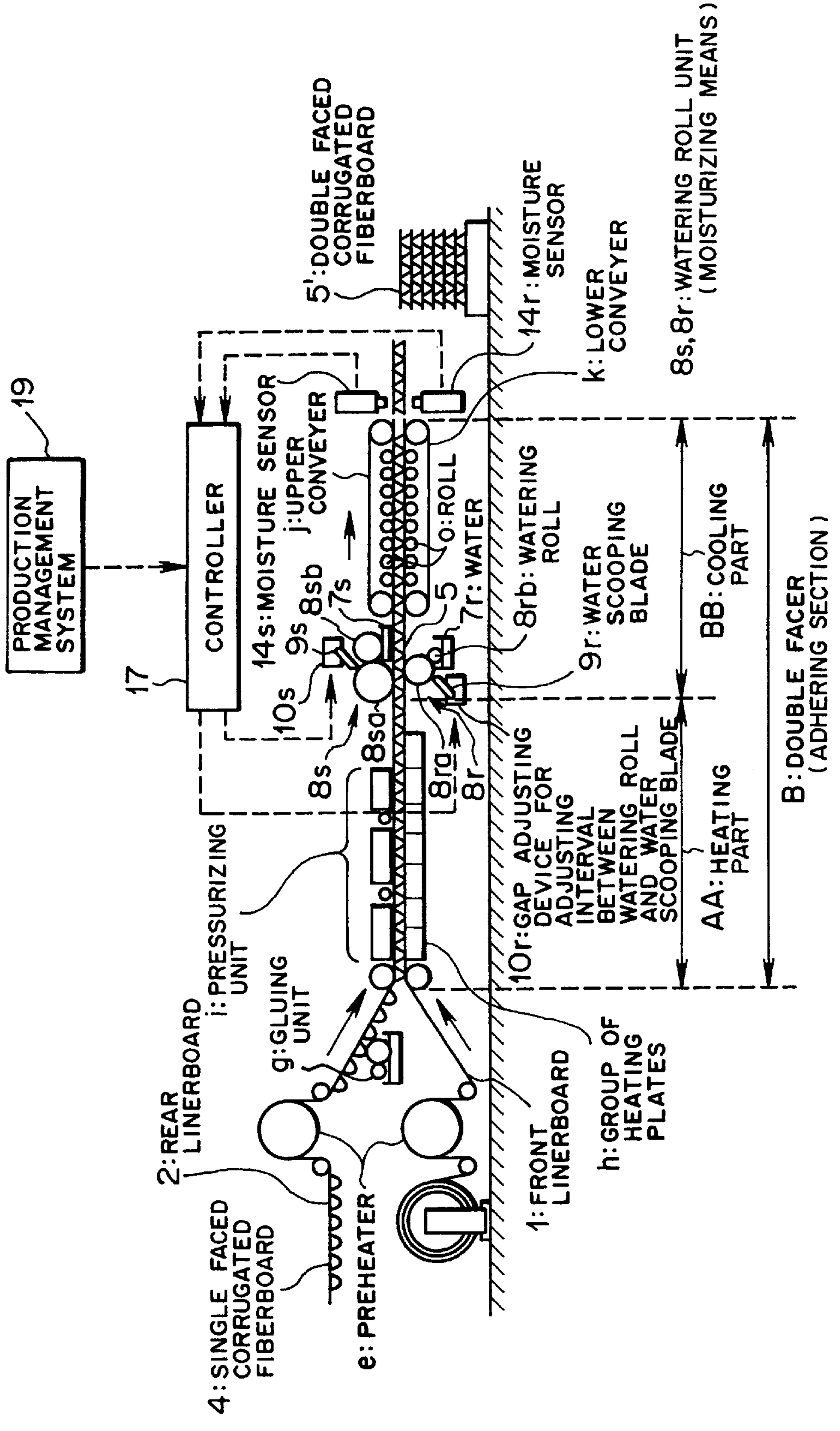
FIG. 8 is a side elevational view schematically showing a corrugator according to a third embodiment of this invention.

FIG. 8 is a side-elevational view schematically showing a corrugator according to a third embodiment of this invention.

In the corrugator according to the third embodiment, as shown in FIG. 8, as compared with the above-described first embodiment, a pair of watering roll units (moisturizing means) 8*s*, 8*r* are placed instead of the pair of water spray units 6*s*, 6*r* for supply moisture to the sheet. That is, in place of the water spray units 6*s*, 6*r*, the watering roll units 8*s*, 8*r* are disposed on the single faced fiberboard sheet 4 side and on the front linerboard 1 side between the heating part AA and the cooling part BB.

In this case, as shown in FIG. 8, the watering roll unit (roll unit) 8*s* comprises watering rolls 8*sa*, 8*sb*, water 7*s*, a water scooping blade 9*s*, and a gap adjusting device 10*s* for adjusting the interval between the watering roll 8*sa* and the water scooping blade 9*s*. The water scooping blade 9*s* is shifted in a radial direction of the watering roll 8*sa* by means of the gap adjusting device 10*s* to adjust the interval between the water scooping blade 9*s* and the watering roll 8*sa*. Thus, the moisture supply quantity to the sheet becomes adjustable. Incidentally, the diameters of the watering rolls 8*sa*, 8*sb* are properly changeable in accordance with the moisture supply quantity.

In this embodiment, as well as the water spray units 6*s* in the above-described first embodiment, a plurality of watering roll units 8*s* each taking this arrangement are situated at a given interval in the sheet cross directions to face the single faced corrugated fiberboard sheet 4 side of the double faced corrugated fiberboard sheet 5 to supply moisture to each of paper areas existing in the cross-directions. Thus, the quantity of moisture to be supplied to the corrugated fiberboard sheet 4 is variable in its cross directions.

Likewise, the watering roll unit (roll unit) 8*r* is, as shown in FIG. 8, made up of watering rolls 8*ra*, 8*rb*, water 7*r*, a water scooping blade 9*r*, and a gap adjusting device 10*r* for adjusting the interval between the watering roll 8*ra* and the water scooping blade 9*r*. The gap adjusting device 10*r* for the adjustment of the interval between the watering roll 8*ra* and the water scooping blade 9*r* moves the water scooping blade 9*r* in a radial direction of the watering roll 8*ra* to adjust the interval between the water scooping blade 9*r* and the watering roll 8*ra*, thereby adjusting the moisture supply quantity to the sheet. Besides, the diameters of the watering rolls 8*ra*, 8*rb* can properly be altered in accordance with the moisture supply quantity.

In this embodiment, as well as the water spray units 6*r* in the above-described first embodiment, a plurality of watering roll units 8*r* each assuming this configuration are located at a given interval in the sheet cross directions to face the front linerboard 1 side of the double faced corrugated fiberboard sheet 5 to supply moisture to each of paper areas lying in its cross directions, so that the quantity of moisture to be supplied to the corrugated fiberboard sheet 4 is variable in its cross directions.

Secondly, a description will be given hereinbelow of a control process in a sheet wetting apparatus for preventing the passage-of-time warp deformation which is a corrugated fiberboard sheet manufacturing method according to this embodiment.

First, as shown in FIG. 8, a controller 17 sets a desired moisture value for the single faced corrugated fiberboard sheet 4 side and the front linerboard 1 side on the immediate downstream side of the cooling part BB, and fetches a moisture measurement value of the single faced corrugated fiberboard sheet 4 side obtained by a moisture sensor 14*s*, a moisture measurement value of the front linerboard 1 side obtained by a moisture sensor 14*r*, and basic weight data of the front and rear linerboards 1, 2 and machine speed data (reference value) from a production management system 19 to calculate the moisture supply quantity to the double faced corrugated fiberboard sheet 5 for achieving the desired moisture.

Whereupon, through the use of the pair of watering roll units 8*s*, 8*r* placed on the single faced corrugated fiberboard sheet 4 side and on the front linerboard I side, the supply of the calculated moisture to the sheet is achievable in a manner of adjusting the intervals between the water scooping blades 9*s*, 9*r* and the watering rolls 8*sa*, 8*ra*.

Accordingly, with the corrugator and corrugated fiberboard sheet manufacturing method according to the third embodiment of this invention, in addition to the effects similar to those of the above-described corrugator according to the first embodiment, the dependency of the moisture attachment quantity on the machine speed is reducible, and the supply of a relatively large amount of moisture to the sheet is easily possible.

Moreover, a description will be made hereinbelow of a fourth embodiment of the present invention.

Figure 9:
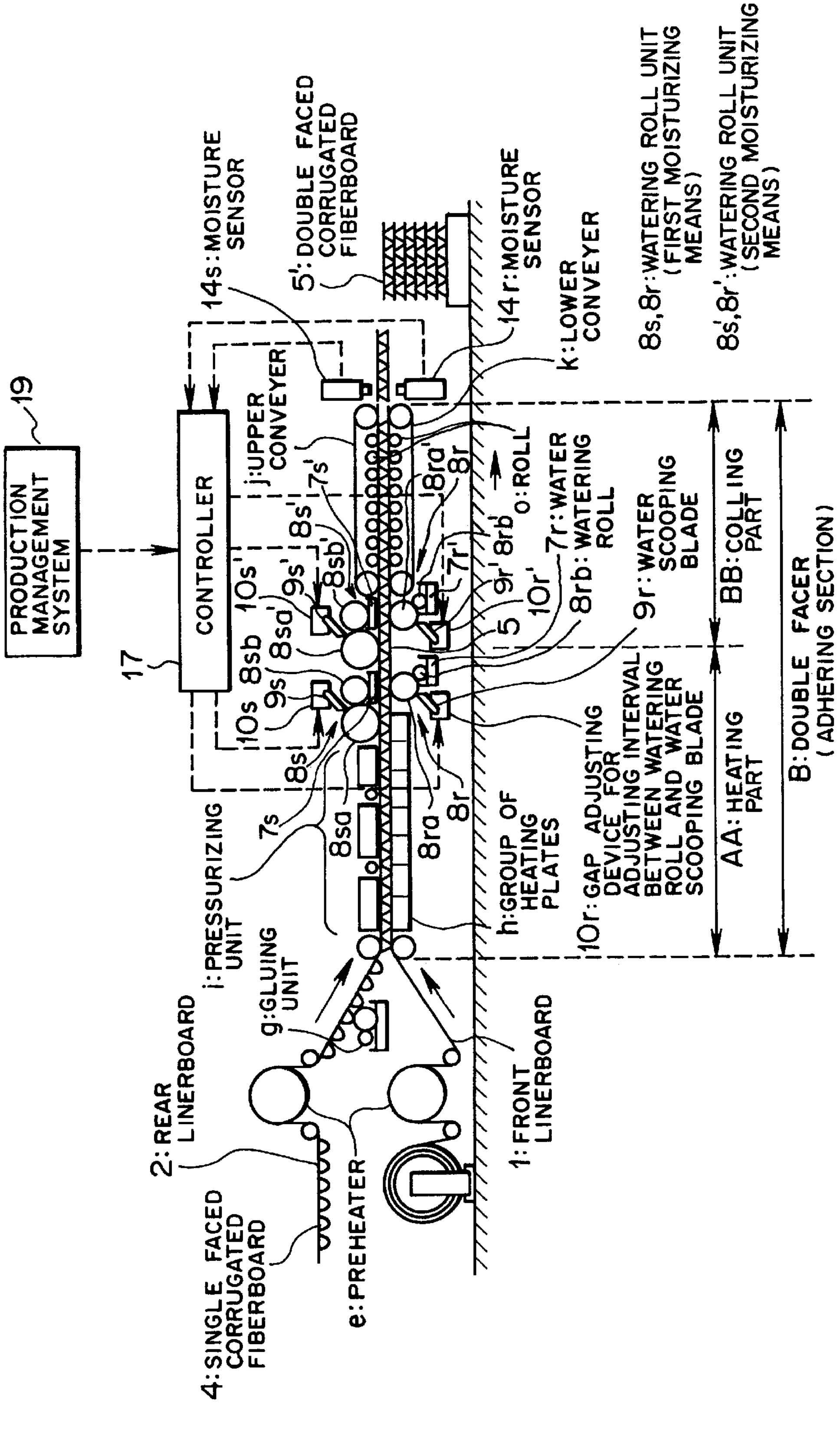
FIG. 9 is a side elevational view schematically showing a corrugator according to a fourth embodiment of this invention.

FIG. 9 is a side elevational view schematically showing a corrugator according to a fourth embodiment of this invention.

As compared with the above-described third embodiment, as shown in FIG. 9, the corrugator according to the fourth embodiment additionally includes a pair of watering roll units (second moisturizing means) 8*s*', 8*r*' on the downstream side of the pair of watering roll units (first moisturizing means) 8*s*, 8*r* between the heating part AA and cooling part BB of the double facer (adhering section) B.

The pair of watering roll units 8*s*', 8*r*' added have the same structure as those of the pair of watering roll units 8*s*, 8*r*. The pair of watering roll units 8*s*', 8*r*' are made to supply the front and rear linerboards with the moisture corresponding to their moisture shortage for the increase in the moisture level in the cross directions in order to equally increase the moisture level of the single faced corrugated fiberboard sheet 4 side and the front linerboard 1 side in their cross directions.

The watering roll unit (roll unit) 8*s*' is, as shown in FIG. 9, composed of watering rolls 8*sa*', 8*sb*', water 7*s*', a water scooping blade 9*s*', and a gap adjusting device 10*s*' for adjusting the interval between the watering roll 8*sa*' and the water scooping blade 9*s*'. Through the gap adjusting device 10*s*' for the adjustment of the interval between the watering roll 8*sa*' and the water scooping blade 9*s*', the water scooping blade 9*s*' is shifted in a radial direction of the watering roll 8*sa*' to adjust the interval between the water scooping blade 9*s*' and the watering roll 8*sa*', thereby adjusting the moisture supply quantity to the sheet. Incidentally, the diameters of the watering rolls 8*sa*', 8*sb*' can properly be changed in accordance with the moisture supply quantity.

In this embodiment, a plurality of watering roll units 8*s*' each having this arrangement are disposed at a given interval in the sheet cross directions to face the single faced corrugated fiberboard sheet 4 side of the double faced corrugated fiberboard sheet 5 to supply moisture to each of paper areas lying in its cross directions so that the moisture supply quantity to the corrugated fiberboard sheet 4 in its cross directions is variable.

Likewise, the watering roll unit (roll unit) 8*r*' is, as shown in FIG. 9, composed of watering rolls 8*ra*', 8*rb*', water 7*r*', a water scooping blade 9*r*', and a gap adjusting device 10*r*' for adjusting the interval between the watering roll 8*ra*' and the water scooping blade 9*r*'. Through the gap adjusting device 10*r*' for the adjustment of the interval between the watering roll 8*ra*' and the water scooping blade 9*r*', the water scooping blade 9*r*' is shifted in a radial direction of the watering roll 8*ra*' to adjust the interval between the water scooping blade 9*r*' and the watering roll 8*ra*', thereby adjusting the moisture supply quantity to the sheet. Besides, the diameters of the watering rolls 8*ra*', 8*rb*' can properly be changed in accordance with the moisture supply quantity.

In this embodiment, a plurality of watering roll units 8*r*' each having this arrangement are disposed at a given interval in the sheet cross directions to face the front linerboard 1 side of the double faced corrugated fiberboard sheet 5 to supply moisture to each of paper areas lying in its cross directions so that the moisture supply quantity to the corrugated fiberboard sheet 4 in its cross directions is variable.

Secondly, a description will be given hereinbelow of a control process in a sheet wetting apparatus for preventing the passage-of-time warp deformation which is a corrugated fiberboard sheet manufacturing method according to this embodiment.

First, as shown in FIG. 9, a controller 17 sets a desired moisture value for the single faced corrugated fiberboard sheet 4 side and the front linerboard 1 side on the immediate downstream side of the cooling part BB, and fetches a moisture measurement value of the single faced corrugated fiberboard sheet 4 side obtained by a moisture sensor 14*s*, a moisture measurement value of the front linerboard 1 side obtained by a moisture sensor 14*r*, and basic weight data of the front and rear linerboards 1, 2 and machine speed data (reference value) from a production management system 19 to calculate the moisture supply quantity to the double faced corrugated fiberboard sheet 5 for achieving the desired moisture.

At this time, the originally existing watering roll units 8*s*, 8*r* supply moisture to the sheet to equally increase the water levels of the single faced corrugated fiberboard sheet 4 side and the front linerboard 1 side in their cross directions, while the watering roll units 8*s*', 8*r*' added equally compensate for the moisture shortage of the front linerboard 1 and the rear linerboard 2 in their cross directions.

Accordingly, with the corrugator and corrugated fiberboard sheet manufacturing method according to the fourth embodiment, in addition to the effects of the above-described third embodiment, the supply of a larger amount of moisture becomes possible.

Moreover, a description will be made hereinbelow of a fifth embodiment of the present invention.

Figure 10:
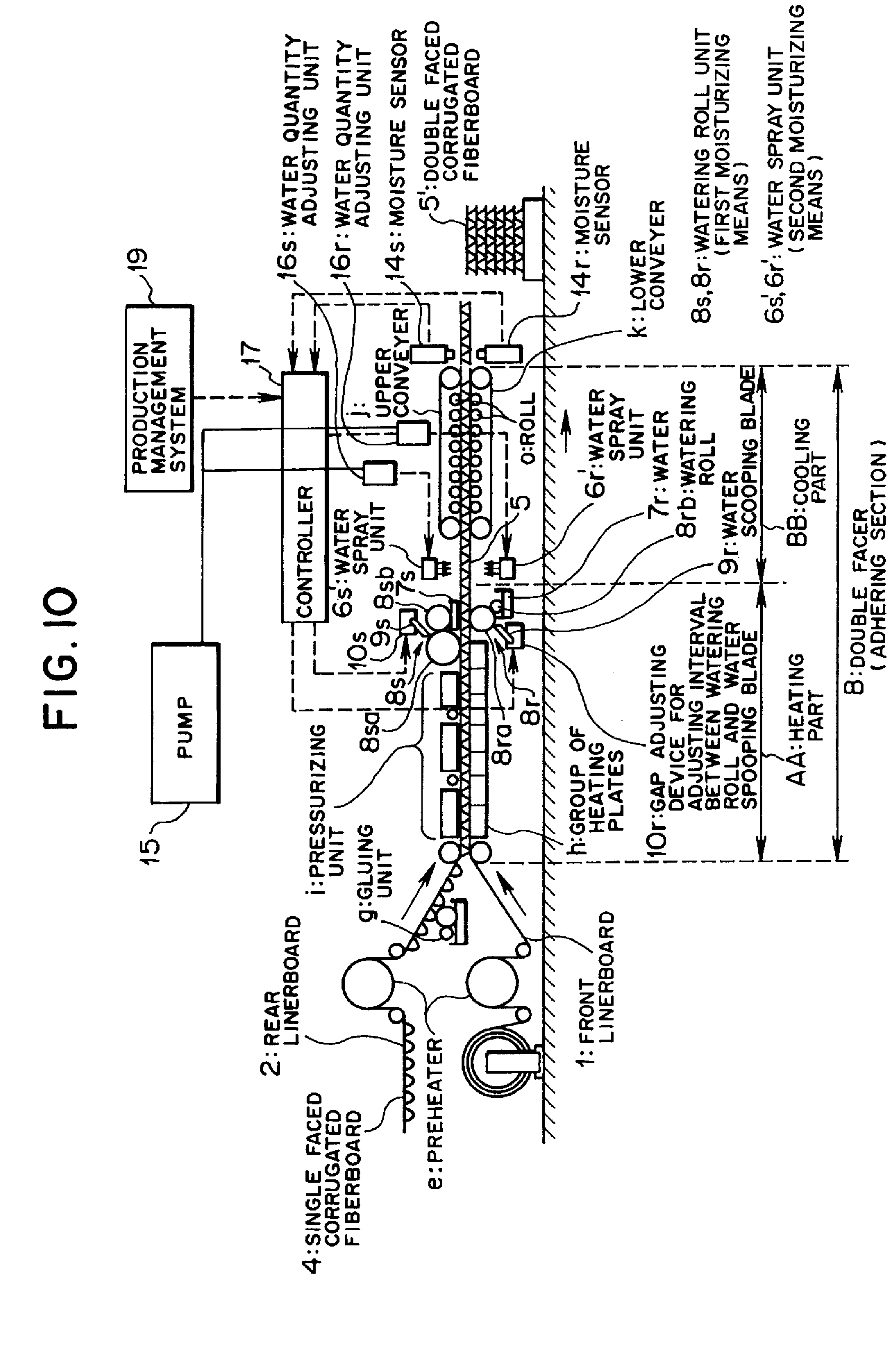
FIG. 10 is a side-elevational view schematically showing a corrugator according to a fifth embodiment of this invention.

FIG. 10 is a side elevational view schematically showing a corrugator according to a fifth embodiment of this invention.

As compared with the above-described fourth embodiment, in the corrugator according to the fifth embodiment, as shown in FIG. 10, a pair of water spray units (second moisturizing means) 6*s*', 6*r*' are additionally provided on the downstream side of a pair of watering roll units (first moisturizing means) 8*s*, 8*r* originally existing between the heating part AA and cooling part BB of the double facer (adhering section) B.

The pair of watering roll units 8*s*, 8*r* are constructed as well as the pair of watering roll units 8*s*, 8*r* in the above-described fourth embodiment. These watering roll units 8*s*, 8*r* supply moisture to the sheet to equally increase the moisture level in the sheet cross directions between the single faced corrugated fiberboard sheet 4 side and the front linerboard 1 side.

Furthermore, the pair of water spray units 6*s*', 6*r*' are constructed to be similar to the pair of water spray units 6*s*', 6*r*' in the above-described first embodiment. These water spray units 6*s*', 6*r*' supply the moisture shortage of the front linerboard 1 and the rear linerboard 2 with the fine control.

Secondly, a description will be given hereinbelow of a control process in a sheet wetting apparatus for preventing the passage-of-time warp deformation which is a corrugated fiberboard sheet manufacturing method according to this embodiment.

First, as shown in FIG. 10, a controller 17 sets a desired moisture value for the single faced corrugated fiberboard sheet 4 side and the front linerboard 1 side on the immediate downstream side of the cooling part BB, and retrieves a moisture measurement value of the single faced corrugated fiberboard sheet 4 side obtained by a moisture sensor 14*s*, a moisture measurement value of the front linerboard 1 side obtained by a moisture sensor 14*r*, and basic weight data of the front and rear linerboards 1, 2 and machine speed data (reference value) from a production management system 19 to calculate the moisture supply quantity to the double faced corrugated fiberboard sheet 5 for providing the desired moisture.

At this time, the watering roll units 8*s*, 8*r* supply moisture to the sheet to equally increase the moisture level in the sheet cross directions between the single faced corrugated fiberboard sheet 4 side and the front linerboard 1 side, while the water spray units 6*s*', 6*r*' supply the moisture shortage of the front linerboard 1 and the rear linerboard 2 in the sheet cross directions while conducting the fine control.

Accordingly, with the corrugator and corrugated fiberboard sheet manufacturing method according to the fifth embodiment of this invention, in addition to the effects of the above-described fourth embodiment, the watering roll units 8*s*, 8*r* uniformly increase the moisture in the sheet cross directions while the water spray units 6*s*', 6*r*' supply the moisture shortage in the sheet cross directions through the fine control.

Although, in the corrugator according to the fifth embodiment, the watering roll units 8*s*, 8*r* are provided on the upstream side in the sheet conveying direction while the water spray units 6*s*, 6*r* are located on the downstream side in the same direction, this invention is not limited to this configuration, but it is also acceptable that the watering roll units 8*s*', 8*r*' are provided on the downstream side in the sheet conveying direction while the water spray units 6*s*', 6*r*' are located on the upstream side in the same direction.

Furthermore, although, in each of the corrugators according to the third to fifth embodiments, a plurality of spray units 8*s*, 8*r*, 8*s*' or 8*r*' are provided at a given interval in the sheet cross directions so that the moisture is adjustable at every area existing in the paper cross directions, it is also appropriate that, in order to avoid the appearance of the portions which exist in the given intervals (which exist between the watering roll units arranged in the paper cross directions) and which are insusceptible to the attachment of moisture, the positions of the watering roll units 8*s*, 8*r*, 8*s*' or 8*r*' are somewhat shifted in the conveying direction of the corrugated fiberboard sheet 5 and a plurality of watering roll units are additionally provided to give moisture to the portions of the corrugated fiberboard sheet 5 existing among the watering roll units 8*s*, 8*r*, 8*s*' or 8*r*'.

Still further, it is also possible that each of the watering rolls 8*sa*, 8*sb*, 8*ra*, 8*rb*, 8*sa*', 8*sb*', 8*ra*' and 8*rb*' is constructed to have a large width to cover the whole in the sheet cross directions while a plurality of water scooping blades 9*s*, 9*r*, 9*s*' or 9*r*' are provided at a given interval in the sheet cross directions with respect to each of the watering rolls 8*sa*, 8*ra*, 8*sa*' and 8*ra*'. In this case, in order to avoid the appearance of the portions which exist in the given sheet cross direction interval of the water scooping blades 9*s*, 9*r*, 9*s*' or 9*r*' (that is, which exist among the water scooping blades arranged in the paper cross directions) and which are insusceptible to the moisture adjustment, the water scooping blades are alternately disposed with respect to each of the watering rolls 8*sa*, 8*ra*, 8*sa*' and 8*ra*'. That is, a plurality of water scooping blades are disposed at a given interval on the first generating line of the outer circumferential surface each of the watering rolls and a plurality of water scooping blades are placed on the second generating line of the outer circumferential surface of each of the watering rolls to come into contact with the portions with which the water scooping blades on the first generating line do not come into contact on the outer circumferential surface of the watering roll.

With this structure, the adjustment of the scooped moisture for the whole in the sheet cross direction is feasible with respect to each of the watering rolls, and the moisture adjustment for the whole corrugated fiberboard sheet 5 in the sheet cross directions is possible.

Besides, although the corrugator and corrugated fiberboard sheet manufacturing method according to each of the above-described embodiments are made to produce a double faced corrugated fiberboard sheet as the corrugated fiberboard sheet, this invention is not limited to this, but is applicable to manufacturing a double wall corrugated fiberboard sheet, a triple wall corrugated fiberboard sheet or a multi wall corrugated fiberboard sheet comprising a larger number of layers.

Furthermore, the control process for the sheet wetting apparatus in the corrugator according to each of the above-described embodiments is not limited to the operation described above.

Still further, although, in the corrugator according to each of the above-described embodiments, the pressurizing devices i' are constructed such that the pressing plates 13 are suspended through the springs 13' and arranged in parallel in the cross directions, the pressurizing devices i' are not limited to this, but it is also acceptable to employ an air pressurizing type therefor.

Moreover, although, in the corrugator according to each of the above-described embodiments, the moisturizing means of the sheet wetting apparatus is placed on the upstream side of the cooling part BB, it is also appropriate that the moisturizing means is positioned on the downstream side of the heating part AA and on the upstream side of the moisture sensors, for example, it is provided on the downstream side of the cooling part BB.

What is claimed is:

1. A corrugator apparatus having an adhering section equipped with a plurality of pressurizing units separately disposed in series along a sheet conveying direction, where a front linerboard and a rear linerboard are adhered to each other to form a corrugated fiberboard sheet and said corrugated fiberboard sheet formed in said adhering section is processed into a predetermined configuration in a processing section standing on the downstream side of said adhering section, said corrugator apparatus comprising:

a sensor system placed on the upstream side of said processing section for detecting a moisture content level of each of said front linerboard and said rear linerboard;

a first moisturizer provided on the upstream side of said sensor system and on the downstream side of the adhering section for directly supplying amounts of additional moisture to a surface of each of said front linerboard and said rear linerboard; and a controller for setting said amounts of additional moisture to be supplied from said first moisturizer on the basis of said detected moisture content level obtained by said sensor system.

2. A corrugator apparatus having an adhering section including a heating section and a cooling section to heat, cool and adhere a front linerboard and a rear linerboard to form corrugated fiberboard sheet, with said corrugated fiberboard sheet formed in said adhering section being processed into a predetermined configuration in a processing section existing on the downstream side of said adhering section, said corrugator apparatus comprising:

sensor system provided between said processing section and said cooling section for detecting a moisture content level of each of said front linerboard and said rear linerboard;

a first moisturizer provided between said heating section and said cooling section for directly supplying amounts of additional moisture to a surface of each of said front linerboard and said rear linerboard; and a controller for setting said amounts of additional moisture to be supplied from said first moisturizer on the basis of said detected moisture content level obtained by said sensor system.

3. The corrugator apparatus of claim 1, wherein said controller sets said amounts of additional moisture to be given to said surface of each of said front linerboard and said rear linerboard on the basis of a desired moisture value calculated in advance and said detected moisture content level obtained by said sensor system.

4. The corrugator apparatus of claim 2, wherein said controller sets said amounts of additional moisture to be given to said surface of each of said front linerboard and said rear linerboard on the basis of a desired moisture value calculated in advance and said detected moisture content level obtained by said sensor system.

5. The corrugator apparatus of claim 3, wherein said controller calculates said desired moisture value on the basis of a width of said corrugated fiberboard sheet, a sheet conveying speed and basic weights of said front linerboard and said rear linerboard.

6. The corrugator apparatus of claim 4, wherein said controller calculates said desired moisture value on the basis of a width of said corrugated fiberboard sheet, a sheet conveying speed and basic weights of said front linerboard and said rear linerboard.

7. The corrugator apparatus of claim 1, wherein said sensor system is designed to detect a moisture content level of said corrugated fiberboard sheet in its cross directions, while said first moisturizer supplies amounts of additional moisture that are variable in the cross directions of said corrugated fiberboard sheet.

8. The corrugator apparatus of claim 7, wherein said sensor system is constructed to be allowed to reciprocate in the cross directions of said corrugated fiberboard sheet.

9. The corrugator apparatus of claim 7, wherein said sensor system comprises a plurality of sensors placed at a given interval in the cross directions of said corrugated fiberboard sheet.

10. The corrugator apparatus of claim 7, wherein said first moisturizer is equipped with either a plurality of spray units or a plurality of watering roll units, each of said watering roll units includes a water scooping blade, wherein said spray unites or said watering roll units are disposed at a given interval in the cross directions of said corrugated fiberboard sheet.

11. The corrugator apparatus of claim 2, wherein said sensor system is designed to detect a moisture content level of said corrugated fiberboard sheet in its cross directions, while said first moisturizer supplies amounts of additional moisture that are variable in the cross directions of said corrugated fiberboard sheet.

12. The corrugator apparatus of claim 11, wherein said sensor system is constructed to be allowed to reciprocate in the cross directions of said corrugated fiberboard sheet.

13. The corrugator apparatus of claim 11, wherein said sensor system comprises a plurality of sensors placed at a given interval in the cross directions of said corrugated fiberboard sheet.

14. The corrugator apparatus of claim 11, wherein said first moisturizer means is equipped with either a plurality of spray units or a plurality of watering roll units, each of said watering roll unit includes a water scooping blades, wherein said spray units or said watering roll units are disposed at a given interval in the cross directions of said corrugated fiberboard sheet.

15. The corrugator apparatus of claim 1, further comprising second moisturizer situated between said first moisturizer and said sensor system for equalizing a moisture content level in each of said front linerboard and said rear linerboard.

16. The corrugator apparatus of claim 15, wherein said second moisturizer is equipped with either a spray unit or a watering roll unit that includes a water scooping blade.

17. A corrugated fiberboard sheet manufacturing method of producing a corrugated fiberboard sheet by adhering a front linerboard to a rear linerboard in an adhering section including a plurality of pressurizing units separately disposed in series along a sheet conveying direction and further of processing said corrugated fiberboard sheet produced in said adhering section into a predetermined configuration in a processing section, said corrugated fiberboard sheet manufacturing method comprising the steps of:

detecting a moisture content level of each of said front linerboard and said rear linerboard on the upstream side of said processing section through the use of a sensor system;

setting amounts of additional moisture to be supplied to a surface of each of said front linerboard and said rear linerboard on the basis of the moisture content level detected through said sensor system; and supplying the set amounts of additional moisture on the upstream side of said sensor system and on the downstream side of said adhering section through the use of a first moisturizer.

18. The corrugated fiberboard sheet manufacturing method of claim 17, wherein said moisture content level to be detected through said sensor system is a moisture content level in cross directions of said corrugated fiberboard sheet, and said amounts of additional moisture to be supplied to said surface of each of said front linerboard and said rear linerboard amounts set on the basis of said moisture content level detected by said sensor system and a desired moisture value calculated in advance on the basis of a width of said corrugated fiberboard sheet, a sheet conveying speed, and a basic weight of each of said front linerboard and said rear linerboard, and the set amounts of additional moisture are given to said corrugated fiberboard sheet through said first moisturizer whereby the amounts of additional moisture are variable in the cross directions of said corrugated fiberboard sheet.

19. The corrugated fiberboard sheet manufacturing method of claim 17, wherein a moisture content level in each of said front linerboard and said rear linerboard is equalized through the use of a second moisturizer provided between the first moisturizer and said sensor system.

20. A corrugated fiberboard sheet manufacturing method of heating, cooling and adhering a front linerboard and a rear linerboard in an adhering section including a heating section and a cooling section to form a corrugated fiberboard sheet, with said corrugated fiberboard sheet formed in said adhering section being processed into a predetermined configuration in a processing section, said corrugated fiberboard sheet manufacturing method comprising the steps of:

detecting a moisture content level of each of said front linerboard and said rear linerboard by a sensor system between said processing section and said cooling section;

setting amounts of additional moisture to be supplied to a surface of each of said front linerboard and said rear linerboard on the basis of the moisture content level detected by said sensor system; and supplying the set amounts of additional moisture through a first moisturizer on the upstream side of said sensor system and on the downstream side of said adhering section.

21. The corrugated fiberboard sheet manufacturing method of claim 20, wherein said moisture content level to be detected by said sensor system is a moisture content level in cross directions of said corrugated fiberboard sheet, and said amounts of additional moisture to be supplied to said surface of each of said front linerboard and said rear linerboard are set on the basis of said moisture content level detected by said sensor system and a desired moisture value calculated in advance on the basis of a width of said corrugated fiberboard sheet, a sheet conveying speed, and a basic weight of each of said front linerboard and said rear linerboard, and the set amounts of additional moisture are given to said corrugated fiberboard sheet through said first moisturizer which is made such that the amounts of additional moisture are variable in the cross directions of said corrugated fiberboard sheet.

22. The corrugated fiberboard sheet manufacturing method of claim 20, wherein a moisture content level in each of said front linerboard and said rear linerboard is equalized through the use of second moisturizer provided between said first moisturizer and said sensor system.

23. The corrugator apparatus of claim 2, further comprising a second moisturizer situated between said first moisturizer and said sensor system for equalizing a moisture content level in each of said front linerboard and said rear linerboard.

24. The corrugator apparatus of claim 23, wherein said second moisturizer is equipped with a spray unit and a watering roll unit that includes a water scooping blade.

* * * * *